(12) United States Patent
Ishihara et al.

(10) Patent No.: US 7,561,432 B2
(45) Date of Patent: Jul. 14, 2009

(54) MEMORY CARD READER APPARATUS

(75) Inventors: Masaaki Ishihara, Kawasaki (JP); Masahiro Kawanishi, Kawasaki (JP); Hiroshi Ogushi, Shiroi (JP); Masato Koshimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 11/221,508

(22) Filed: Sep. 8, 2005

(65) Prior Publication Data

US 2007/0170254 A1 Jul. 26, 2007

(30) Foreign Application Priority Data

Sep. 9, 2004 (JP) ............... 2004-262476

(51) Int. Cl.
*H05K 7/00* (2006.01)
*H05K 1/14* (2006.01)
(52) U.S. Cl. ...................... 361/737; 361/600
(58) Field of Classification Search ......... 361/736–737, 361/727, 686, 600, 728, 748, 752
See application file for complete search history.

(56) References Cited

U.S. PATENT DOCUMENTS

| | | | | |
|---|---|---|---|---|
| 5,926,916 A | * | 7/1999 | Lee et al. ...................... | 16/230 |
| 6,604,955 B2 | * | 8/2003 | Dawson et al. ............... | 439/181 |
| 6,781,634 B1 | * | 8/2004 | Shiozaki et al. ............. | 348/374 |
| 6,942,153 B1 | * | 9/2005 | Yuan et al. ............. | 235/472.01 |
| 7,123,487 B2 | * | 10/2006 | Saito et al. ................... | 361/801 |
| 2003/0123220 A1 | * | 7/2003 | Huang ........................ | 361/685 |
| 2005/0070156 A1 | * | 3/2005 | Behl ....................... | 439/541.5 |
| 2005/0120165 A1 | * | 6/2005 | Liang ......................... | 711/103 |
| 2006/0223381 A1 | * | 10/2006 | Combs et al. ............... | 439/677 |

FOREIGN PATENT DOCUMENTS

JP 2003-085958 3/2003

* cited by examiner

*Primary Examiner*—Hung S Bui
(74) *Attorney, Agent, or Firm*—Canon USA Inc IP Div

(57) ABSTRACT

A memory card reader apparatus includes an electric board having a connector into which a memory card is inserted, a board holder holding the electric board, a card connector cover having a card slot, and an exterior cover different from the card connector cover. The board holder is positioned relative to the exterior cover. The board holder and the card connector cover are positioned in at least two directions perpendicular to the direction in which the memory card is inserted and pulled out.

10 Claims, 31 Drawing Sheets

MEMORY CARD READER APPARATUS

BACKGROUND OF THE INVENTION

1. Field of the Invention

The present invention relates to a memory card reader apparatus incorporated in a facsimile, a photocopier, or a multi-function printer.

2. Description of the Related Art

When a memory card reader apparatus is incorporated in an image reading apparatus or an image forming apparatus, a board having a memory card connector is desirably near to a card slot because the user often accesses the connector. Therefore, the board is attached to, for example, the outer part of an inner frame of the apparatus, an exterior cover of the apparatus, or a control-panel cover of the apparatus (Japanese Patent Laid-Open No. 2004-082577). In order to prevent damage due to static electricity, the board is covered with a metal plate, or attached not to a plastic frame or cover of the apparatus but to a metal board-holder (Japanese Patent Laid-Open No. 2003-085958).

In the case of machines such that personal preference has an influence on the choice at the point of purchase, for example, consumer machines, emphasis can be placed on the appearance (design). Normally, an exterior cover and a control panel of such machines are manufactured by plastic injection molding. Sink marks and burrs due to change of parameters (e.g., injection pressure) during molding have negative influence on the appearance. However, the parameters have influence also on accuracy of size and shape of the components. Especially in the case of a large component having a large amount of plastic, it is difficult to pursue both the accuracy of size and shape and a good appearance at the same time.

In an image reading apparatus reading a document or an image forming apparatus forming an image on a recording medium in accordance with recorded information, exterior components such as an exterior cover and a control panel are relatively large. In the case of such large exterior components, in order to reduce the cost and to shorten the development period and the production period, a structure that does not require very high accuracy is required. If this requirement is satisfied, the apparatus can be designed more flexibly. In a lot of conventional apparatuses, a card slot is formed in an exterior component (e.g., an exterior cover or a control panel), and a card board is attached to the exterior component, or to a part of an inner frame, or to another component attached to the inner frame.

Therefore, concerning the inside dimension of the exterior component having the card slot and the distance to the component to which the card board is attached, very high accuracy is required. If this is not satisfied, the position of the card slot does not correspond exactly with that of the card connector, and therefore a memory card cannot be smoothly inserted into the connector. If the memory card is forced into the connector, the connector and the memory card can be damaged.

SUMMARY OF THE INVENTION

The present invention is made in consideration of the above technical problems. The present invention provides a memory card reader apparatus such that a card slot can be positioned relative to a card connector with a high degree of accuracy, and therefore a memory card can be inserted smoothly and set firmly.

In the present invention, a memory card reader apparatus includes an electric board having a connector into which a memory card is inserted, a board holder holding the electric board, a card connector cover having a card slot, and an exterior cover different from the card connector cover. The board holder is positioned relative to the exterior cover. The board holder and the card connector cover are positioned in at least two directions perpendicular to the direction in which the memory card is inserted and pulled out.

Further features of the present invention will become apparent from the following description of exemplary embodiments (with reference to the attached drawings).

BRIEF DESCRIPTION OF THE DRAWINGS

FIG. 35A shows the apparatus with the lid closed. FIG. 35B shows the apparatus with the lid open.

DESCRIPTION OF THE EMBODIMENTS

Figure 1:
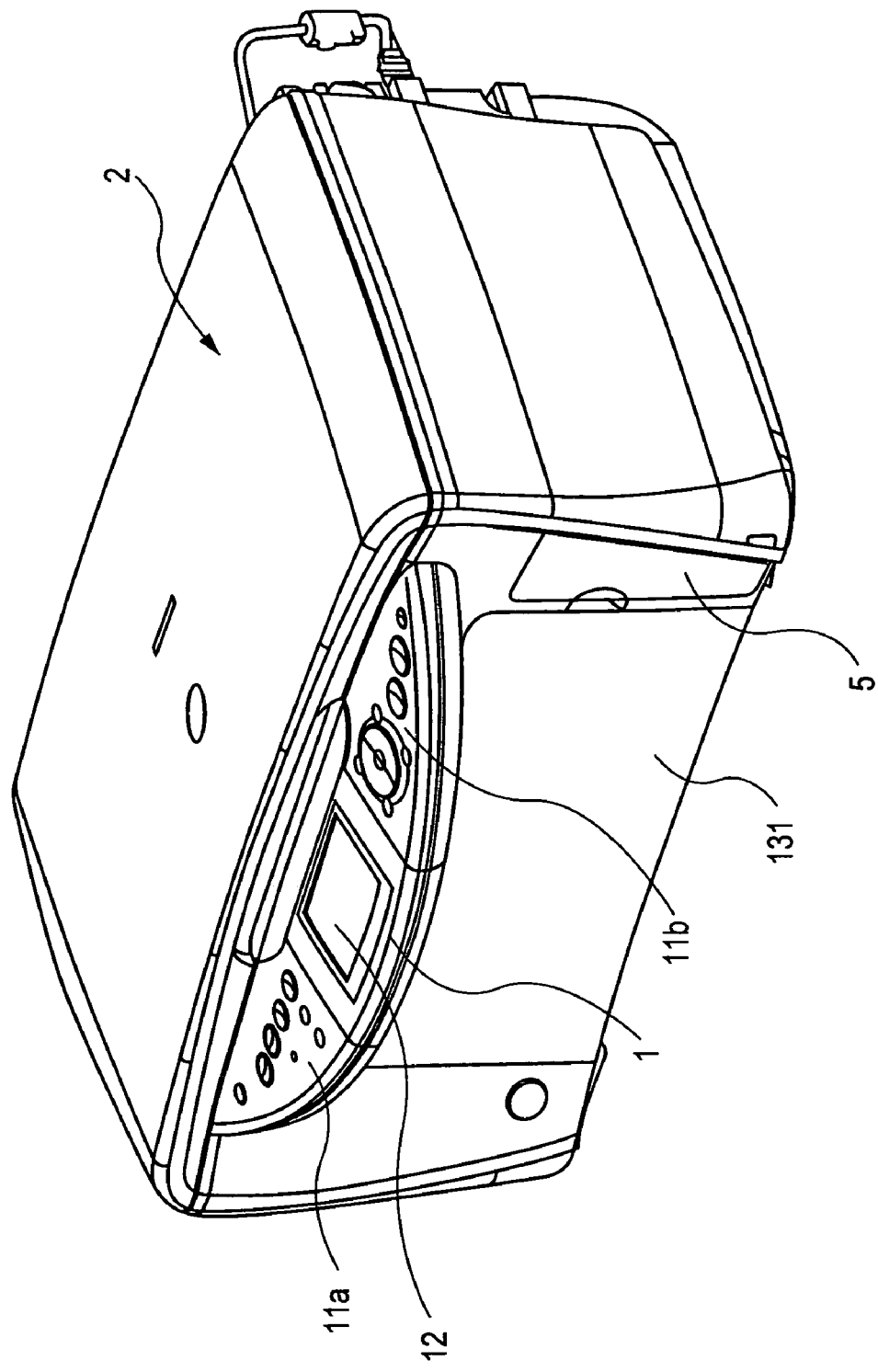
FIG. 1 is a schematic perspective view of an image reading and recording apparatus according to an embodiment of the present invention.
Figure 2:
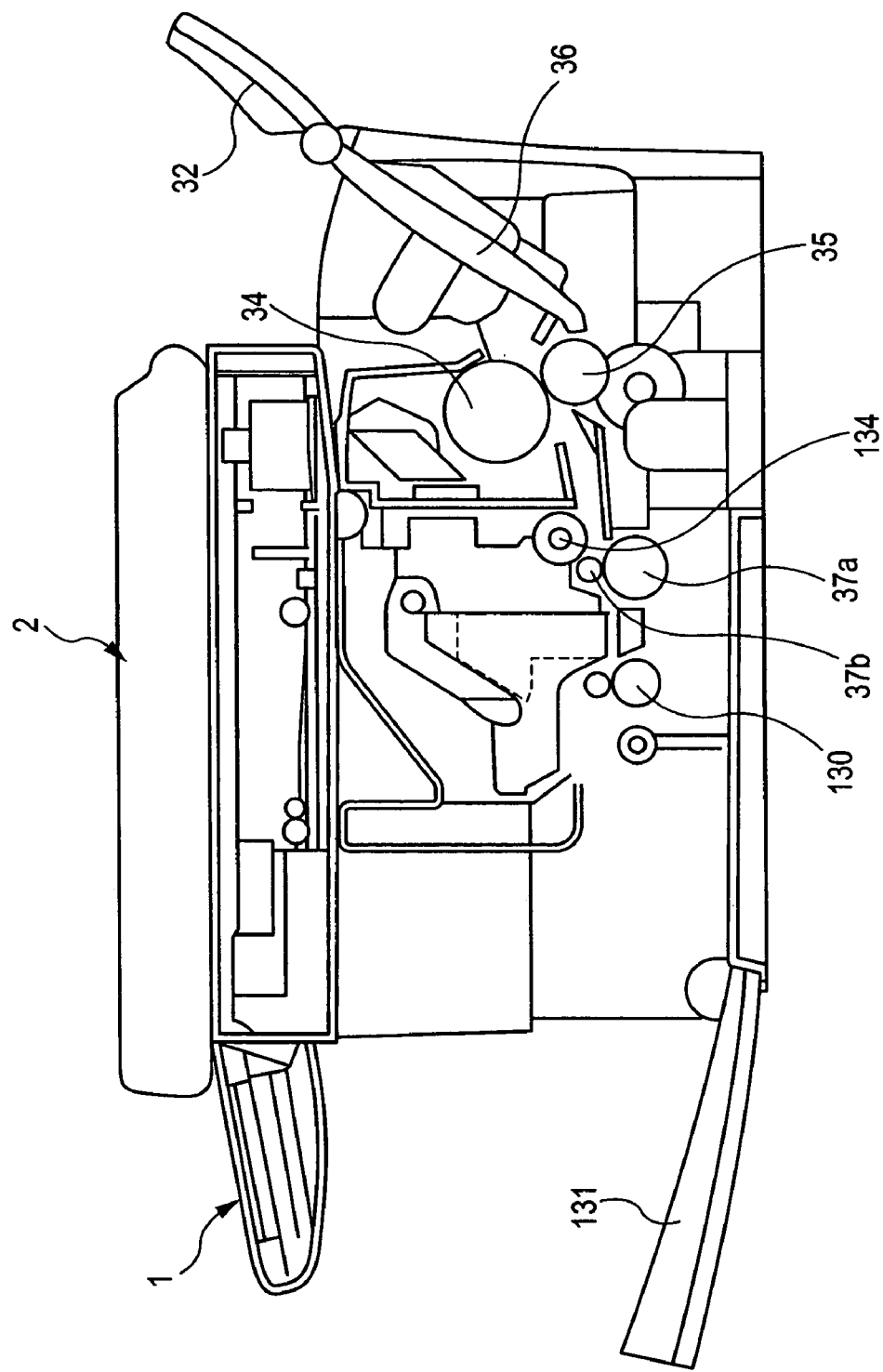
FIG. 2 is a vertical sectional view of the image reading and recording apparatus.

Embodiments of the present invention will now be described with reference to the drawings. In the drawings, the same reference numerals designate the same or corresponding components. A reference numeral with a letter designates a subcomponent of a component designated by the same reference numeral without a letter. FIG. 1 is a schematic perspective view of an image reading apparatus according to an embodiment of the present invention. FIG. 2 is a vertical sectional view of the image reading apparatus. In FIGS. 1 and 2, the image reading apparatus includes a panel unit 1, a scanner unit 2, a recording unit 3, an electric board unit 4, and a card slot unit 5. Incidentally, since the image reading apparatus has a recording unit, it can also be called an "image reading and recording apparatus."

Figure 3:
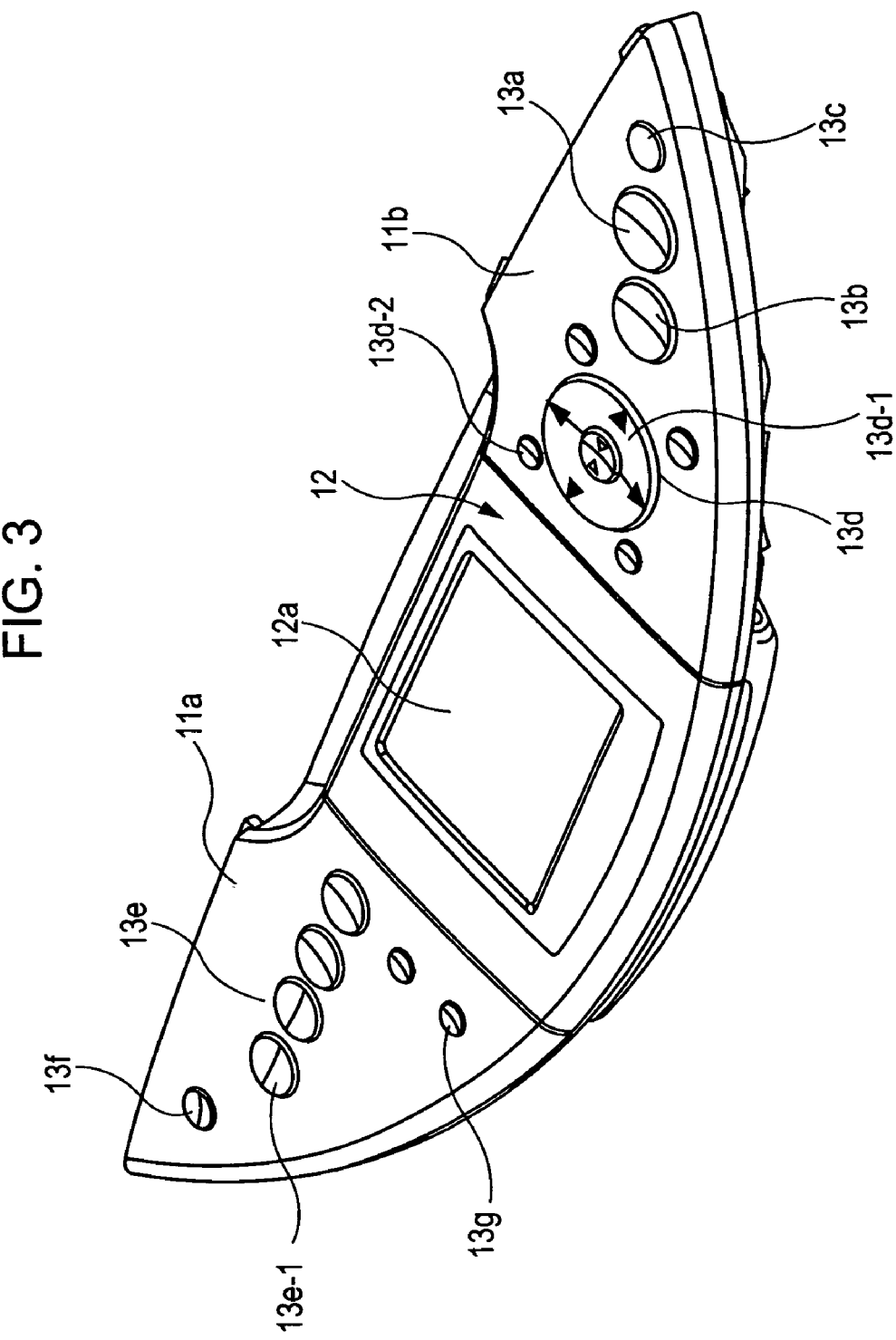
FIG. 3 is a schematic perspective view of a panel unit of the image reading and recording apparatus.
Figure 4:
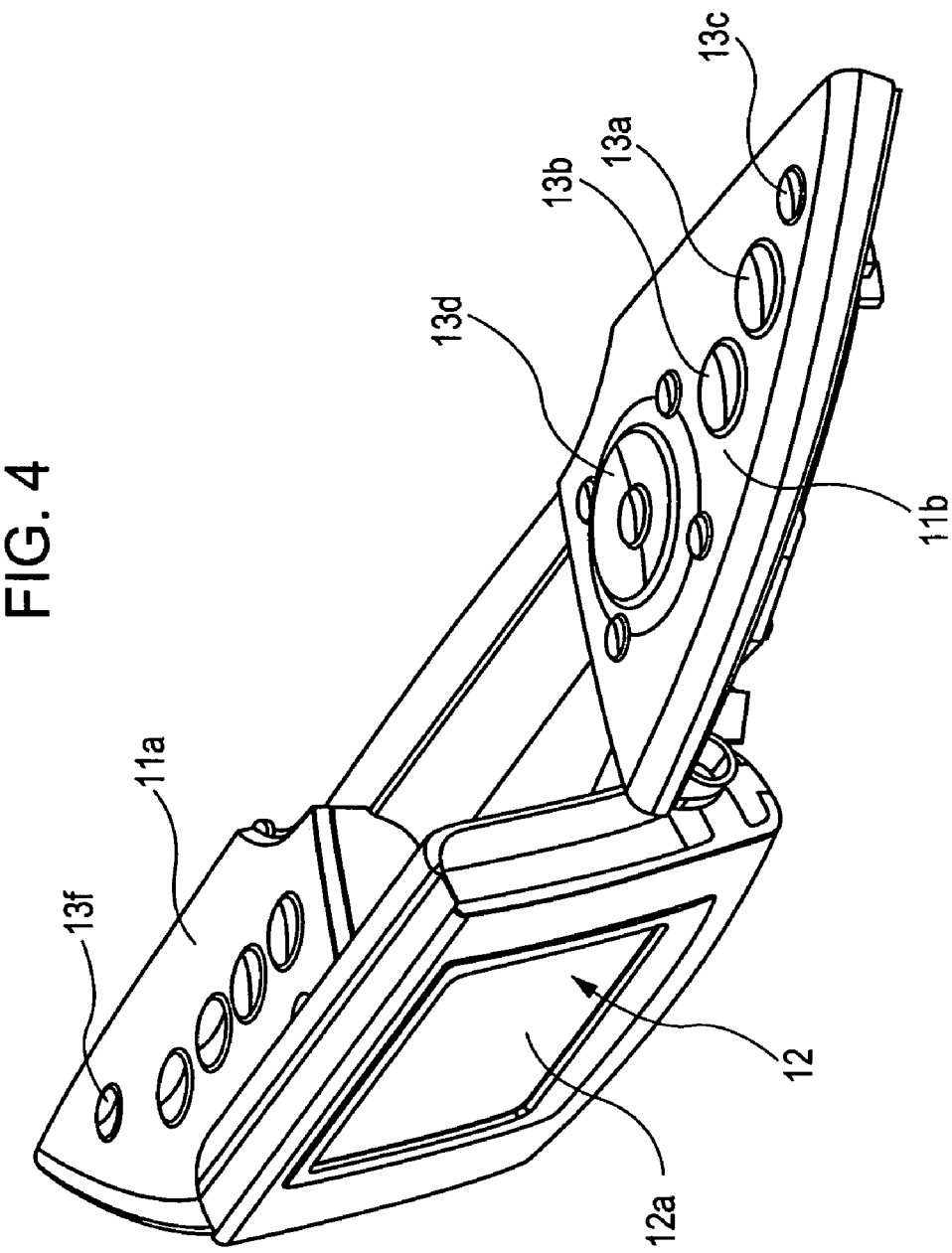
FIG. 4 is a schematic perspective view showing the panel unit with an LCD in the upright position.
Figure 5:
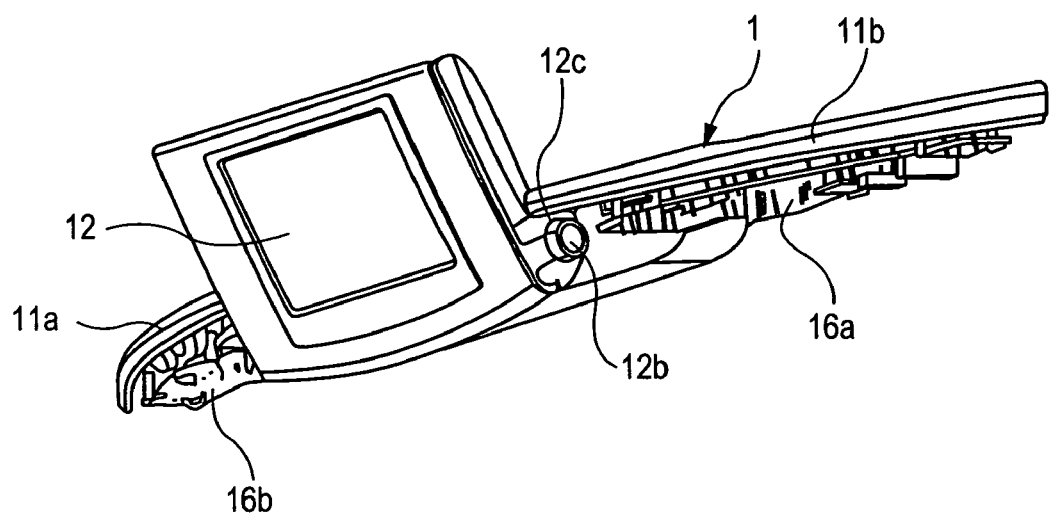
FIG. 5 is a schematic perspective view showing a rotation stopper for the LCD.
Figure 6:
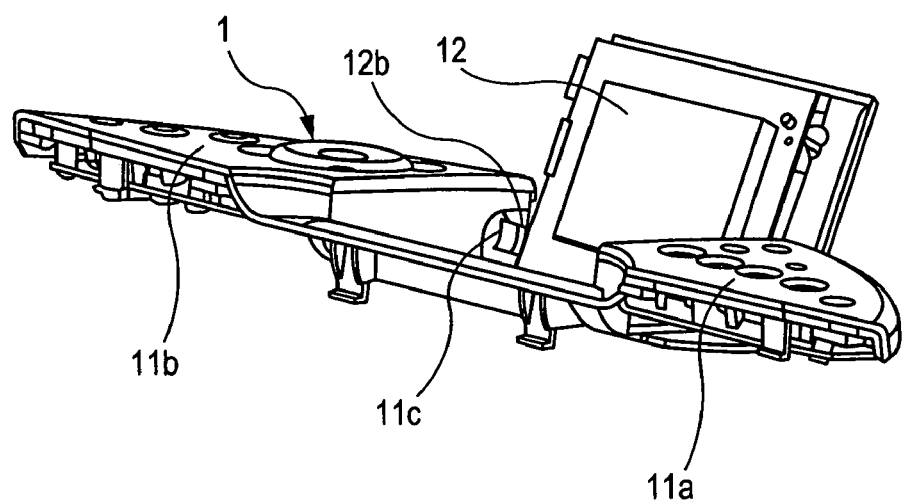
FIG. 6 is a schematic perspective view from a different angle showing the rotation stopper.
Figure 7:
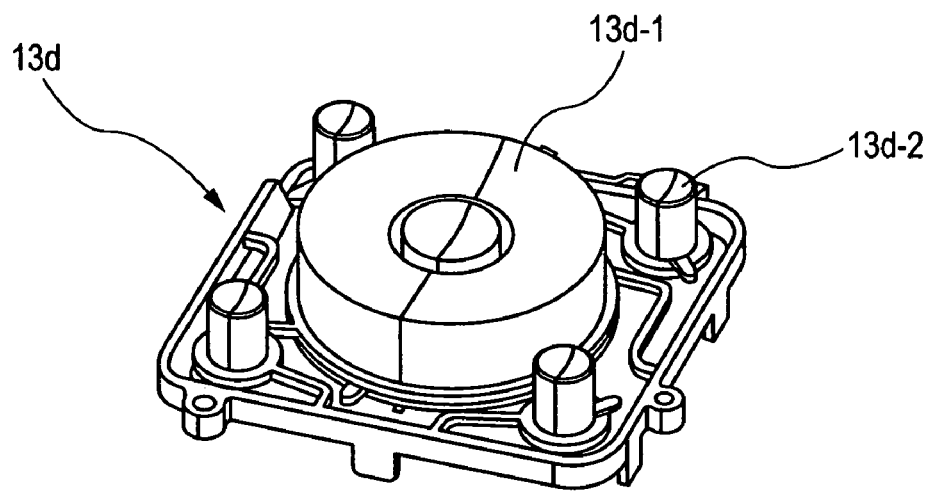
FIG. 7 is a schematic perspective view showing an arrow key of the panel unit.
Figure 8:
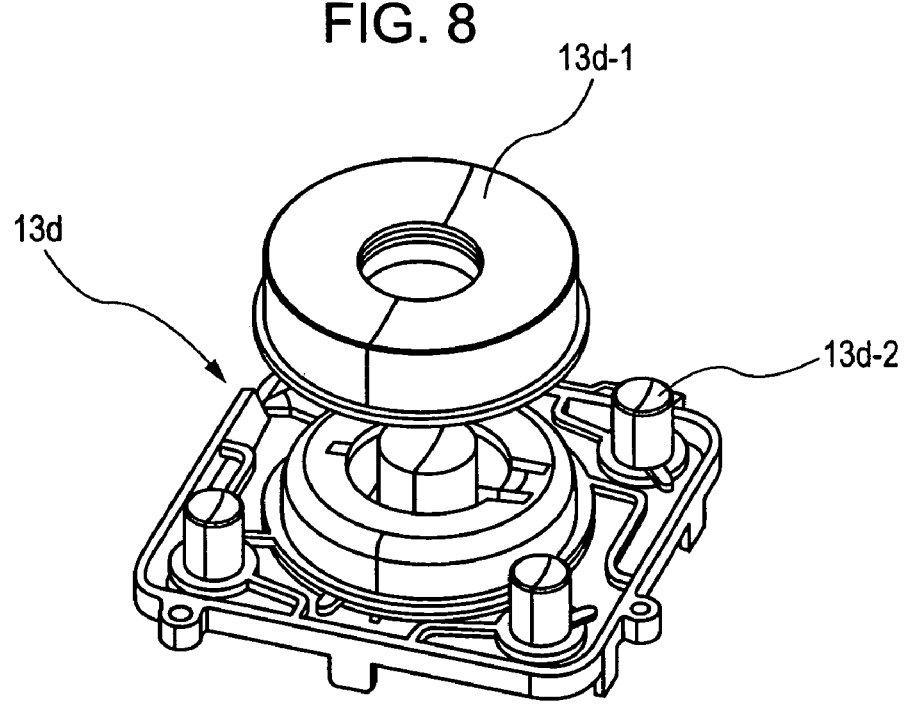
FIG. 8 is a schematic exploded perspective view showing the arrow key.
Figure 9:
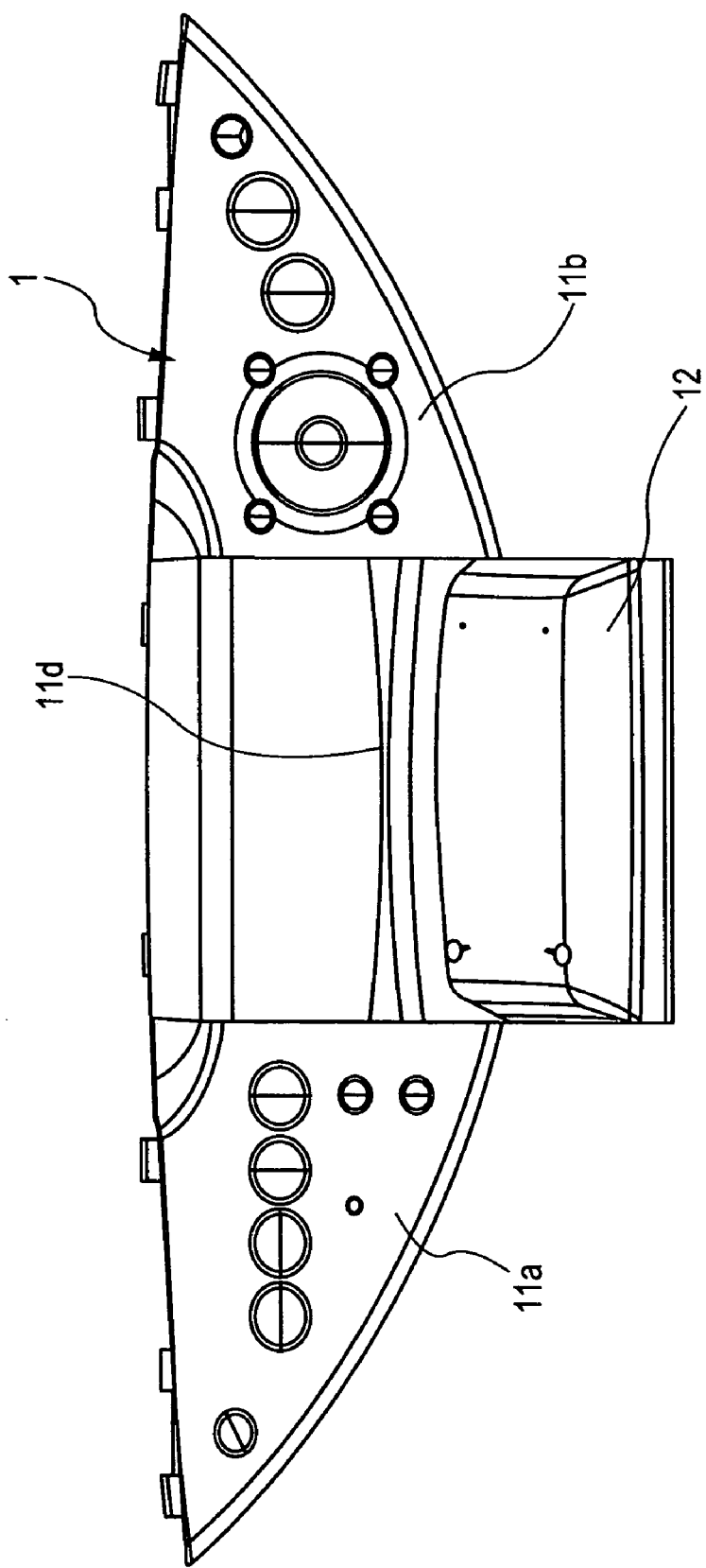
FIG. 9 is a top plan view of the panel unit with the LCD in the upright position.

First, the panel unit 1 will be described. FIG. 3 is a schematic perspective view of the panel unit 1. FIG. 4 is a schematic perspective view showing the panel unit 1 with an LCD 12 in the upright position. FIG. 5 is a schematic perspective view showing a rotation stopper for the LCD 12. FIG. 6 is a schematic perspective view from a different angle showing the rotation stopper. FIG. 7 is a schematic perspective view showing an arrow key 13d of the panel unit 1 of FIG. 3. FIG. 8 is a schematic exploded perspective view showing the arrow key 13d of FIG. 7. FIG. 9 is a top plan view of the panel unit 1 with the LCD 12 in the upright position.

The panel unit 1 is attached to the scanner unit 2. As shown in FIGS. 3 and 4, the panel unit 1 includes the rotatable LCD 12 between a left panel cover 11a and a right panel cover 11b. The panel covers 11a and 11b include various keys 13. That is to say, a color start key 13a, a monochrome start key 13b, a stop key 13c, the arrow key 13d, mode keys 13e, a power key 13f, and function keys 13g are disposed on the upper surfaces of the panel covers 11a and 11b. As shown in FIG. 5, the panel unit 1 further includes panel boards 16a and 16b on the lower surface. Tactile switches (not shown) are soldered to the panel boards 16a and 16b. The LCD 12 includes an LCD module and an electric board (both not shown) in the inside, and a transparent window 12a on the face.

The LCD 12 is hinged to the panel cover 11 and can be rotated by the user. As shown in FIG. 4, the LCD 12 can rotate up to about 110 degrees from the horizontal position. The maximum angle is held by the rotation stopper. The rotation stopper includes stopper ribs 12c on both sides of the LCD (see FIG. 5) and stopper grooves 11c at the corresponding positions in the panel cover 11 (see FIG. 6). The stopper ribs 12c are pressed against the stopper groove 11c, thereby holding the maximum angle. As shown in FIG. 9, when the LCD 12 is in the upright position, there is a small clearance 11d between the LCD 12 and the panel cover 11. If the user tries to rotate the LCD 12 more than 110 degrees, the LCD 12 and the panel cover 11 on opposite sides of the clearance 11d are pressed against each other before the rotation stopper (12c, 11c) is broken. Normally, the clearance 11d is about 1 mm, and therefore the LCD 12 and the panel cover 11 on opposite sides of the clearance 11d are not scratched by each other.

As shown in FIGS. 7 and 8, the arrow key 13d has a double structure consisting of a cap 13d-1 and a base 13d-2. The cap 13d-1 is painted, and the base 13d-2 is not painted. The reason for the double structure is that if the cap 13d-1 and the base 13d-2 are formed as a unit, it is necessary to mask the base 13d-2 when the cap 13d-1 is painted, and therefore the manufacturing process is complicated. The cap 13d-1 is fitted into the base 13d-2 with light pressure.

Figure 10:
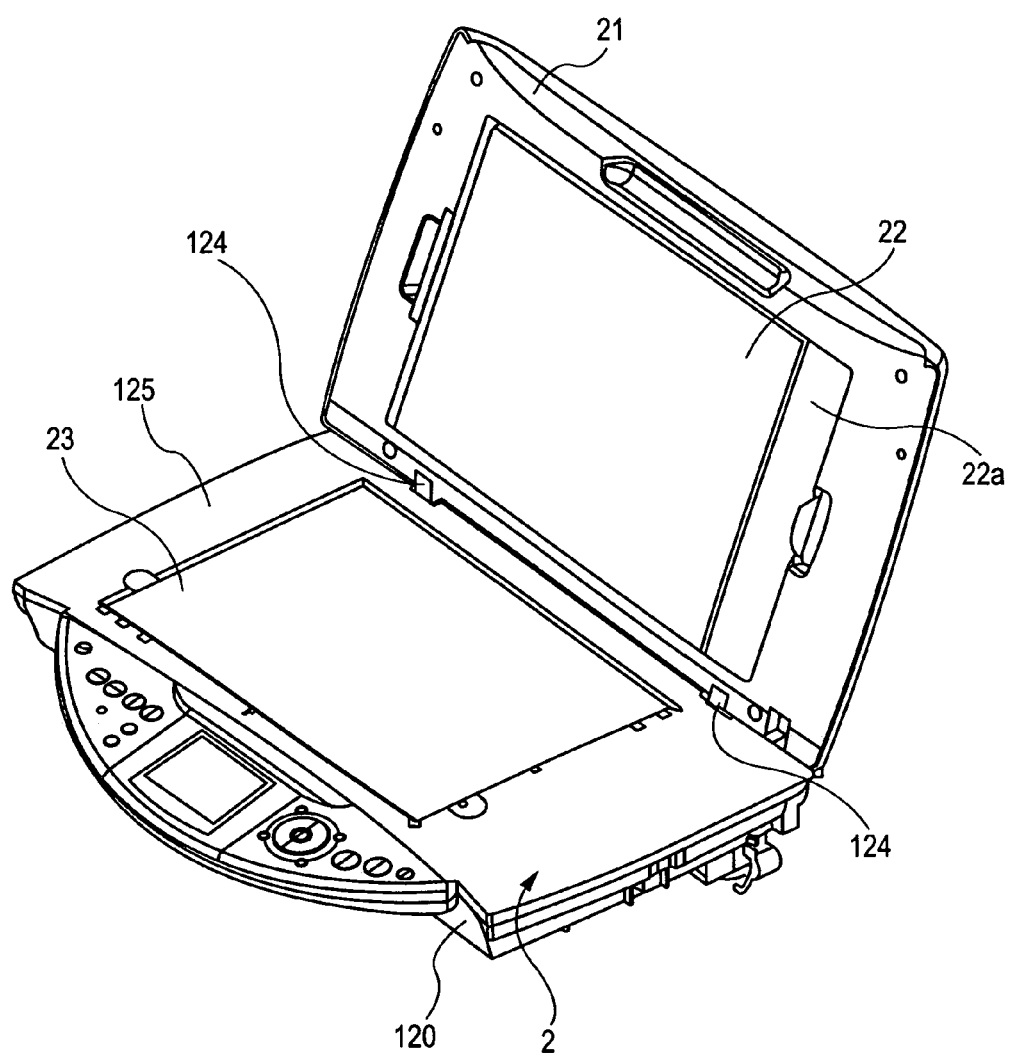
FIG. 10 is a schematic perspective view showing a scanner unit when a document is set therein.

Next, the scanner unit 2 will be described. FIG. 10 is a schematic perspective view showing the scanner unit 2 when a document is set therein. In FIG. 10, the document is placed face down on a glass plate 23. The glass plate 23 is pressed against a scanner frame 120 by a cover 125. The document is pressed against the glass plate 23 by a pressing plate 21. A sponge frame 22a is attached to the pressing plate 21. A pressing white sheet 22 is attached to the sponge frame 22a. The pressing white sheet 22 includes a sponge and a white sheet. The pressing white sheet 22 serves as a pressing sheet for reading a reflective document. The pressing plate 21 including the sponge frame 22a and the pressing white sheet 22 is attached to one end of the scanner frame 120 with hinges 124.

Figure 11:
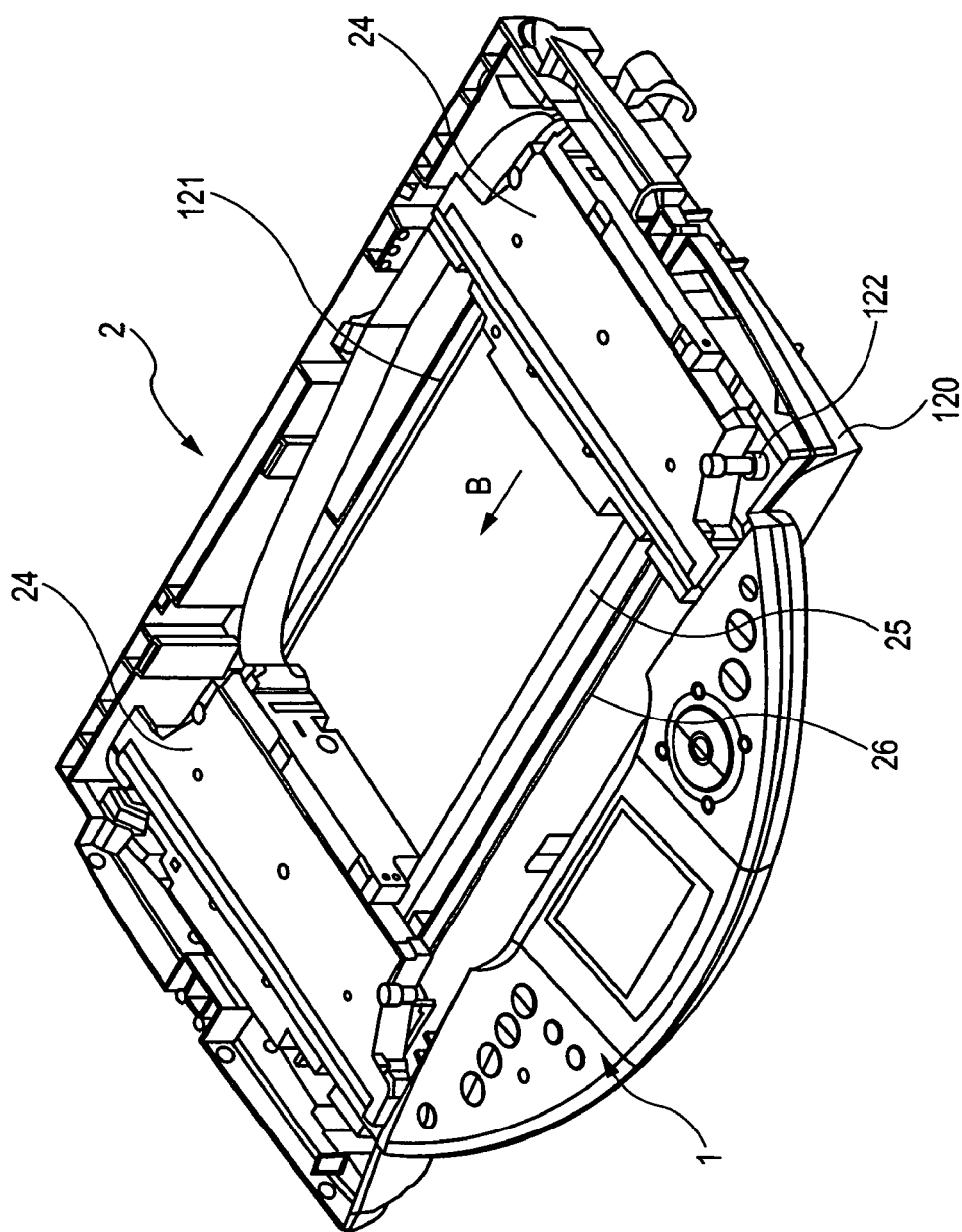
FIG. 11 is a schematic perspective view of the scanner unit with a glass plate and a cover removed for illustrating the inner structure.

FIG. 11 is a schematic perspective view of the scanner unit 2 with the glass plate 23 and the cover 125 removed for illustrating the inner structure. In FIG. 11, a CCD scan unit 24 can move from side to side in the scanner unit 2. All inner components of the scanner unit 2 are attached to the scanner frame 120. The CCD scan unit 24 reads an image of a document. Guided by a shaft 25 and a rail 121, the CCD scan unit 24 reciprocates. The CCD scan unit 24 is driven by a motor (not shown) through drive gears 122 for speed reduction and a timing belt 26. The timing belt 26 is hooked around a pulley (not shown) disposed opposite the drive gears 122. When photocopying is performed, or when scanning is performed according to commands from a PC, the CCD scan unit 24 is moved in the direction shown by arrow B. In synchronization with this, an image of a document is read through the glass plate 23.

Figure 12:
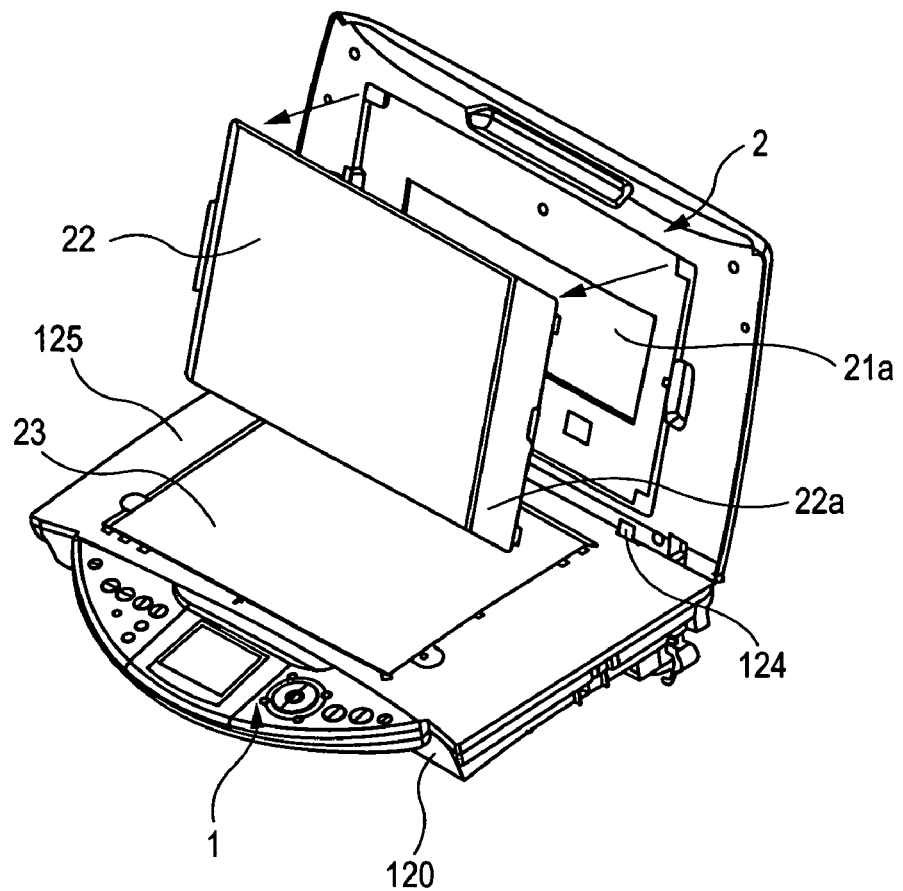
FIG. 12 is a schematic perspective view showing the scanner unit with a sponge frame removed to expose a light source for transmissive documents.

Next, operation in the case where a transmissive document (e.g., a film) is read will be described. The sponge frame 22a is detachably attached to the pressing plate 21. The pressing plate 21 has a surface emitter 21a, which is used as a light source for reading a transmissive document. FIG. 12 is a schematic perspective view showing the scanner unit 2 with the sponge frame 22a removed to expose the surface emitter 21a. The reason why the sponge frame 22a is detachable and the pressing plate 21 has the surface emitter 21a is that in order to read a transmissive document such as a film, it is necessary to shine light through the transmissive document and that a light source is therefore disposed above the document surface.

Figure 13:
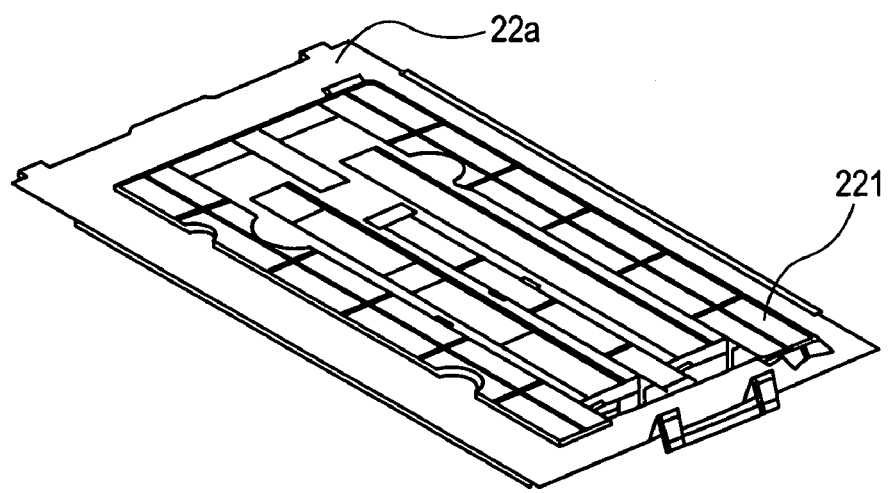
FIG. 13 is a schematic perspective view showing the sponge frame with a film holder attached thereto.
Figure 14:
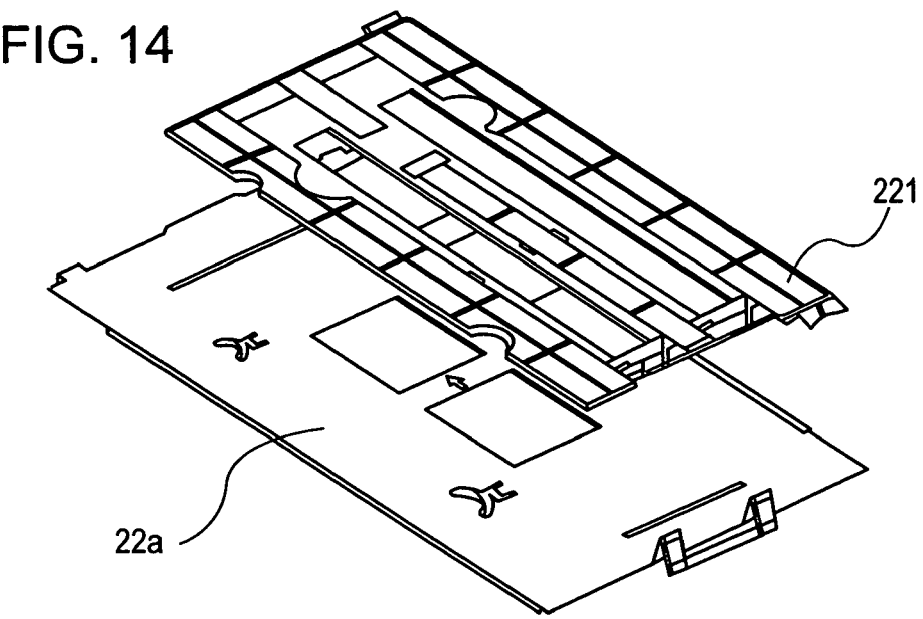
FIG. 14 is a schematic perspective view showing the sponge frame with the film holder detached.

FIG. 13 is a schematic perspective view showing the sponge frame 22a with a film holder 221 attached thereto. FIG. 14 is a schematic perspective view showing the sponge frame 22a with the film holder 221 detached. As shown in FIGS. 10, 13, and 14, the sponge frame 22a is detachably attached to the pressing plate 21, and the pressing white sheet 22 serving as a pressing sheet is attached to the sponge frame 22a. The film holder 221 is attached to the sponge frame 22a. After the sponge frame 22a is detached from the pressing plate 21, the film holder 221 can be detached from the sponge frame 22a as shown in FIG. 14.

Figure 15:
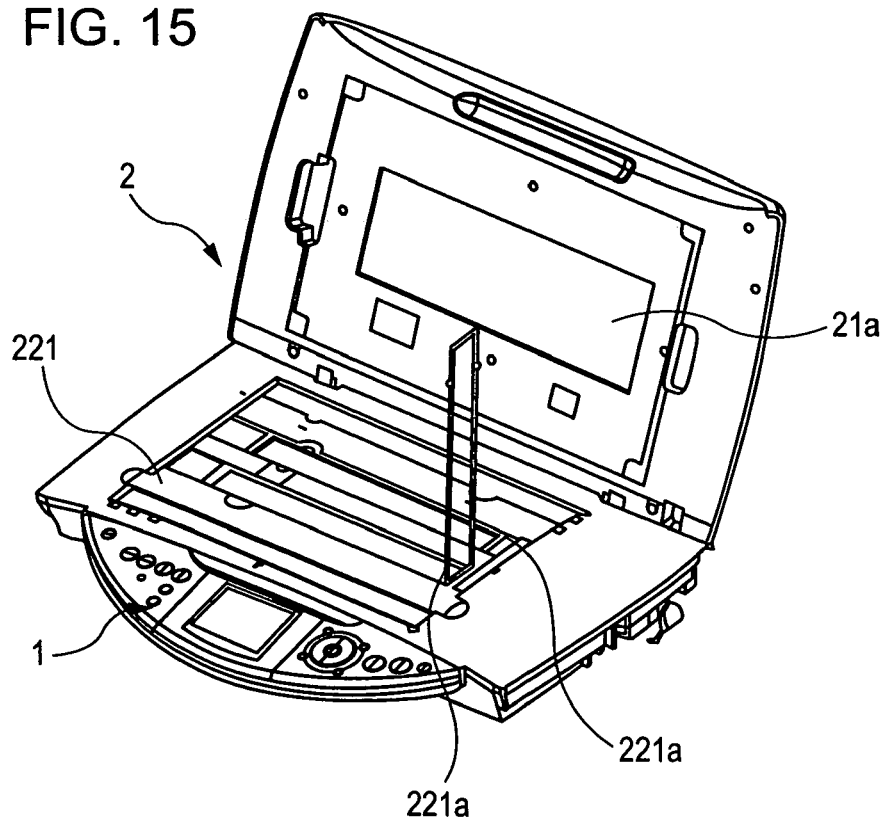
FIG. 15 is a schematic perspective view showing the scanner unit that is getting ready to read a transmissive document such as a film.

FIG. 15 is a schematic perspective view showing the scanner unit 2 that is getting ready to read a transmissive document such as a film. As shown in FIG. 15, the film holder 221 detached from the sponge frame 22a is set on the glass plate 23, and then a holding member 221a is raised. After a transmissive document is set, the holding member 221 is lowered to fix the transmissive document. Thereafter, the pressing plate 21 is closed to complete preparation for reading the transmissive document. In the present embodiment, in the case where a plurality of kinds of film holders are used according to kind of films, at least one of the plurality of kinds of film holders can be attached to the sponge frame 22a.

Figure 16:
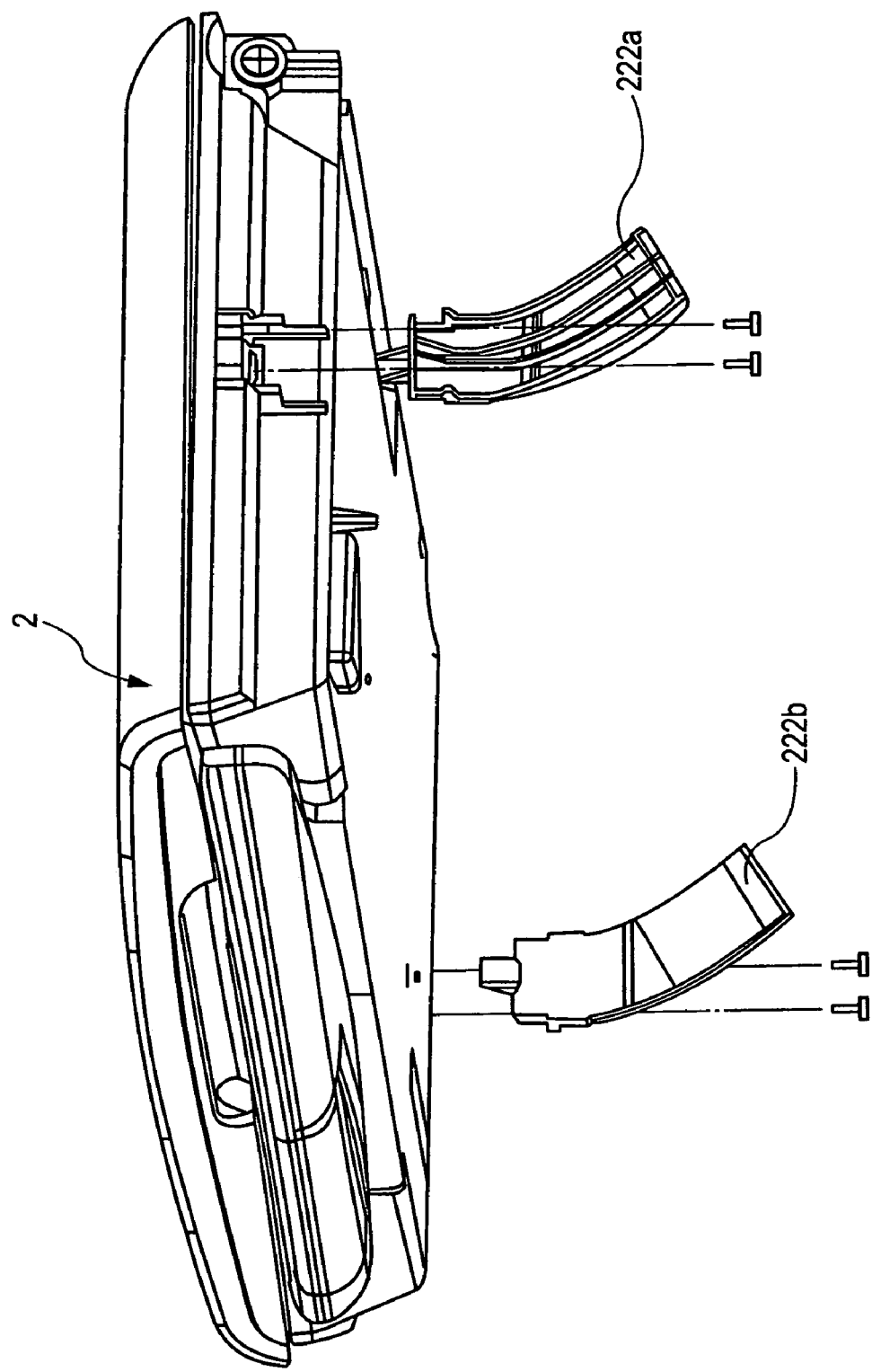
FIG. 16 is a schematic perspective view showing a structure attaching the scanner unit to the apparatus body.
Figure 17:
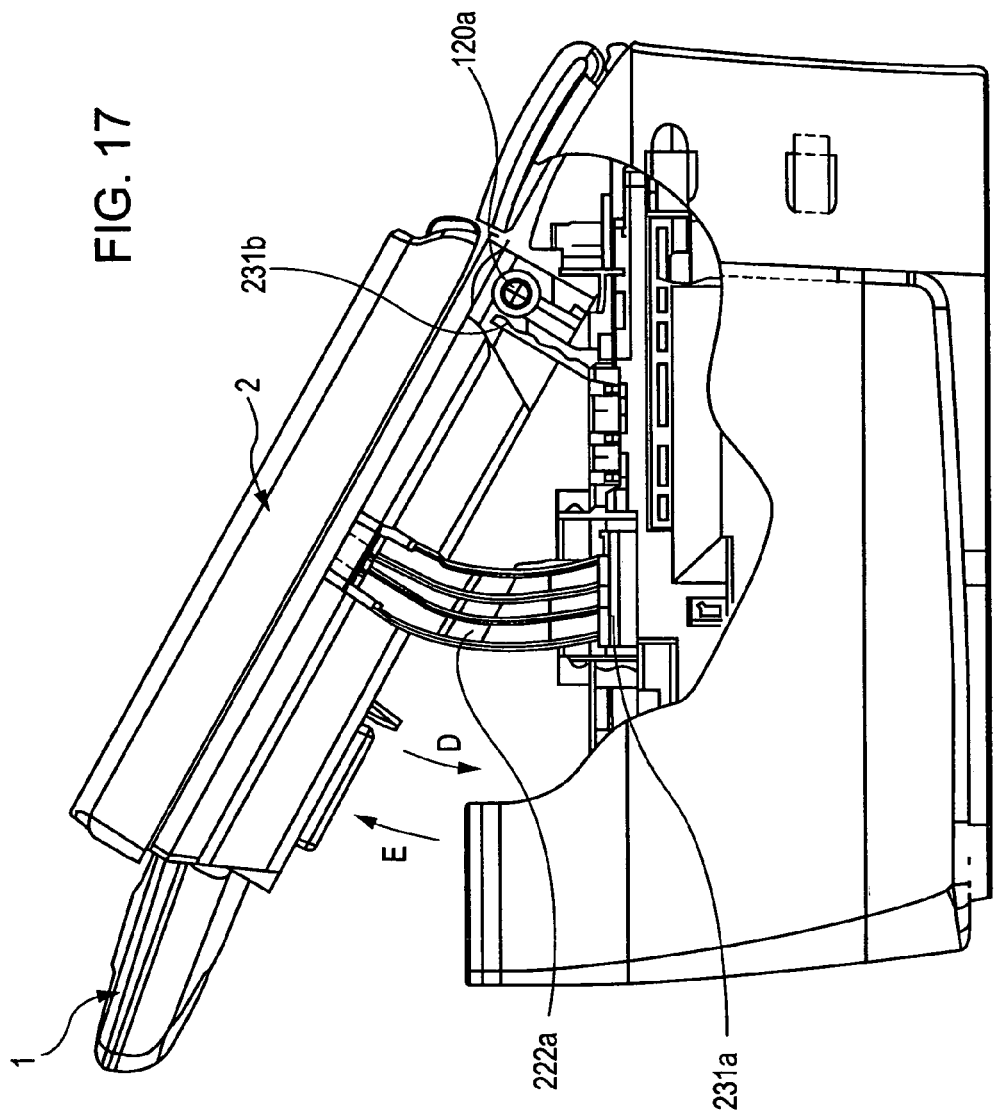
FIG. 17 is a schematic side view showing the image reading and recording apparatus with the scanner unit open.
Figure 18:
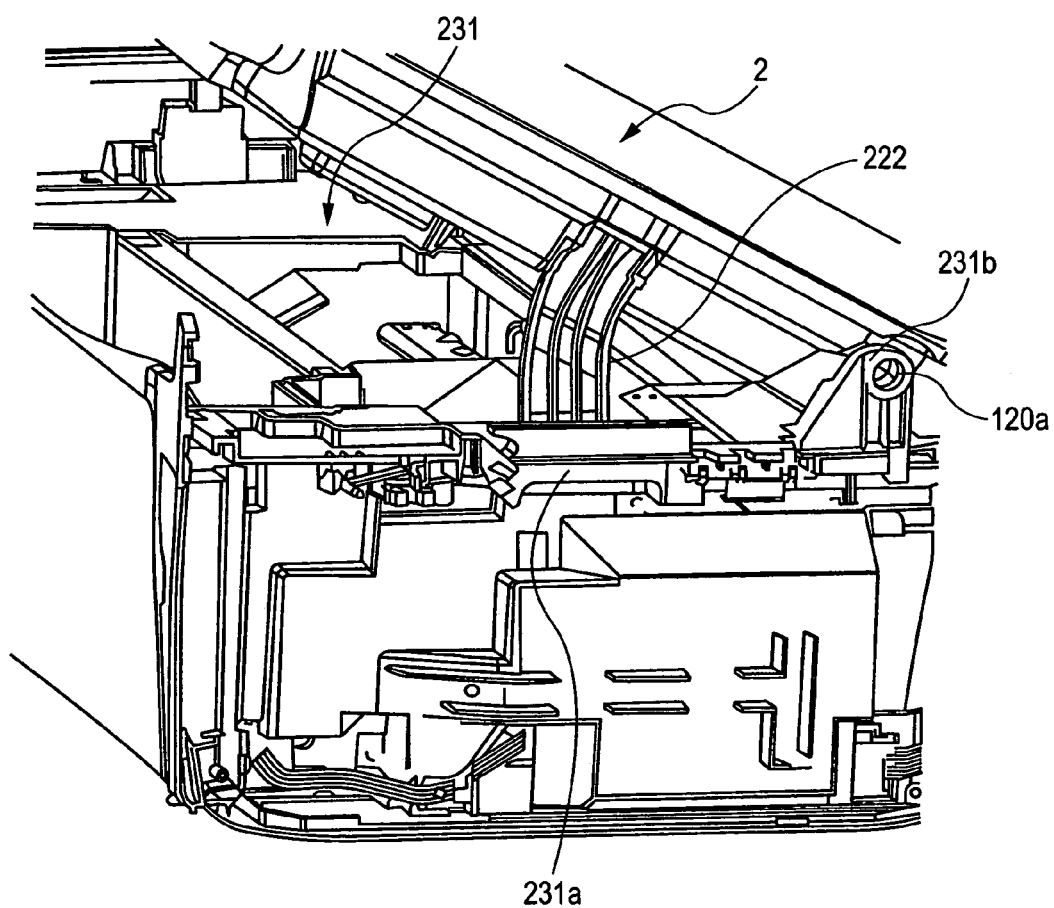
FIG. 18 is a schematic perspective view showing a lock mechanism for holding the scanner unit open.

Next, a structure attaching the scanner unit 2 to a body of the image reading apparatus (image reading and recording apparatus) will be described. FIG. 16 is a schematic perspective view showing the structure attaching the scanner unit 2 to the apparatus body. FIG. 17 is a schematic side view showing the apparatus body with the scanner unit 2 open. FIG. 18 is a schematic perspective view showing a lock mechanism for holding the scanner unit 2 open. FIGS. 19A to 19D are schematic vertical sectional views showing a link member 222a between the apparatus body and the scanner unit 2 at various positions. FIG. 20 is a partial enlarged vertical sectional view showing a lock structure of a hinge that rotatably joins the scanner unit 2 to the apparatus body.

As shown in FIG. 16, the link members 222 (222a and 222b) are attached to both sides of the scanner unit 2. When the scanner unit 2 is open, as shown in FIGS. 17 and 18, hinges 120a of the scanner frame 120 are fitted in bearings 231b of a middle frame 231 of the apparatus body. The link members 222 (only 222a is shown in FIG. 17) are mounted on stoppers 231a of the middle frame 231, thereby limiting the motion of the scanner unit 2 in the direction shown by arrow D (closing direction).

Figures 19A, 19B, 19C, 19D:
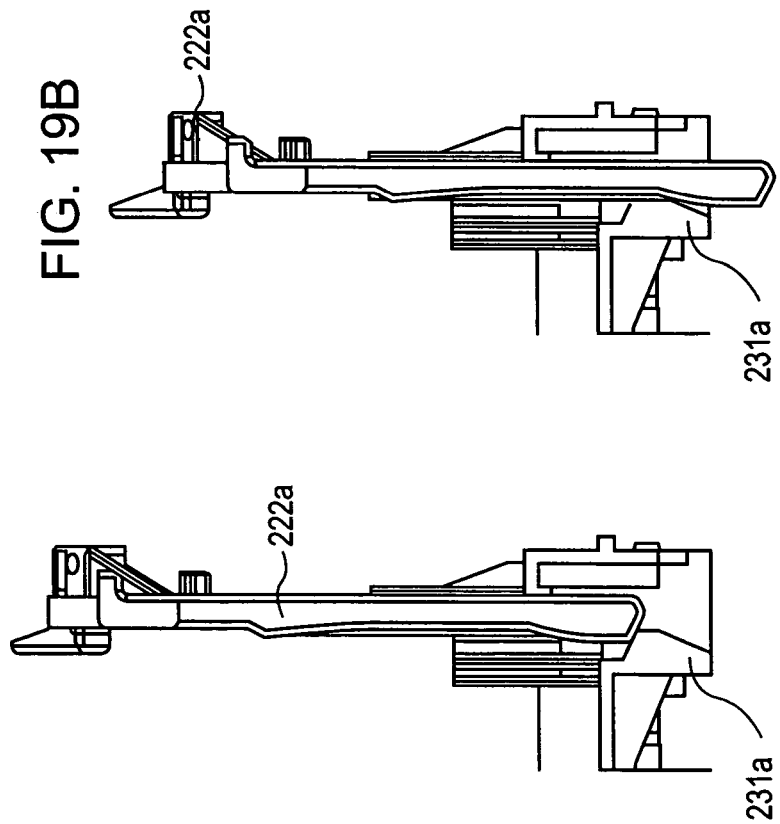
FIGS. 19A to 19D are schematic vertical sectional views showing a link member between the apparatus body and the scanner unit at various positions.
Figure 20:
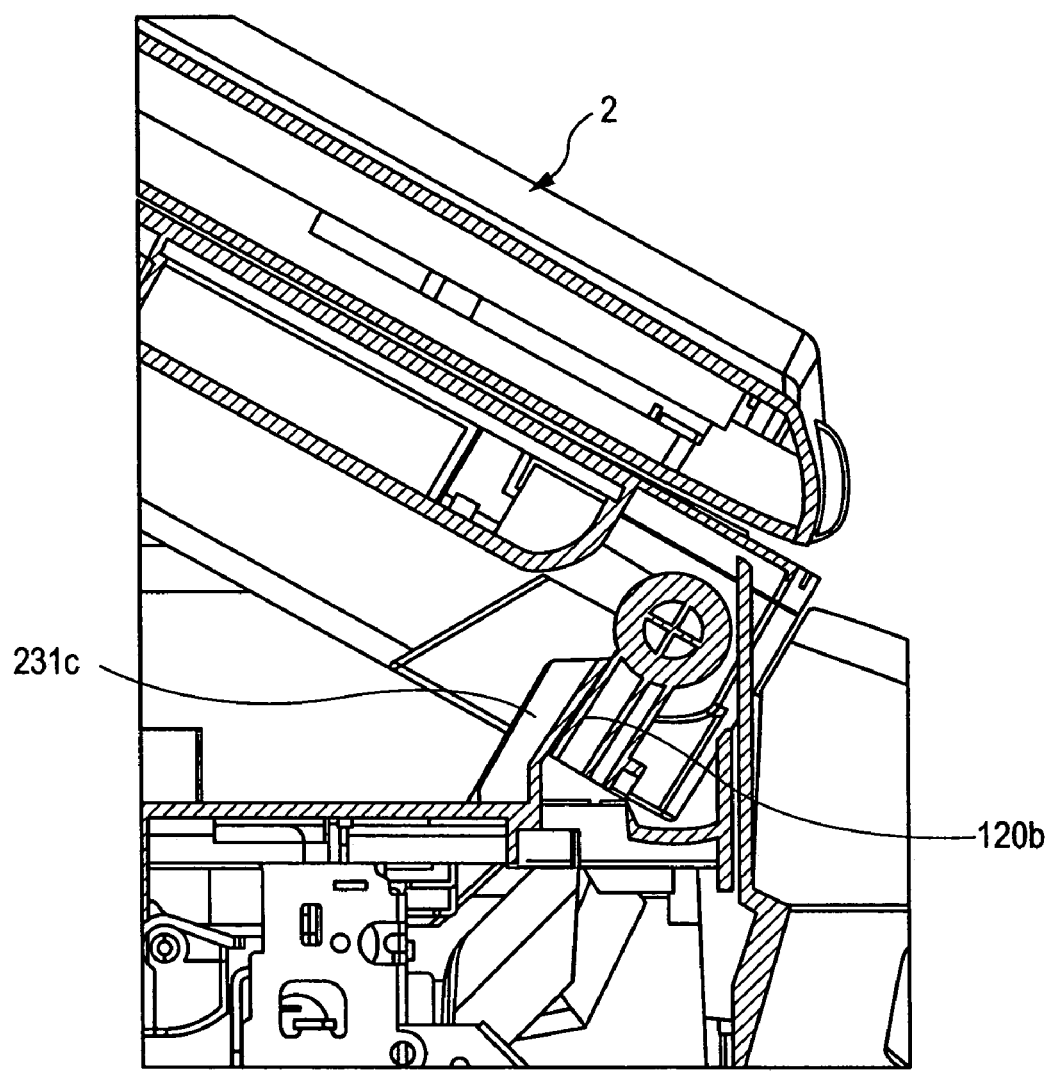
FIG. 20 is a partial enlarged vertical sectional view showing a lock structure of a hinge that rotatably joins the scanner unit to the apparatus body.

When the scanner unit 2 is at the angle shown in FIGS. 17 and 18, the link member 222a is mounted on the stopper 231a as shown in FIG. 19A. When a force over a certain magnitude in the direction shown by arrow D in FIG. 17 is applied to the scanner unit 2, the link member 222a is forced into the stopper 231a as shown in FIGS. 19B and 19C. When the link member 222a is in the position shown in FIG. 19D, the scanner unit 2 is completely closed. FIG. 20 shows a lock mechanism for limiting the motion of the scanner unit 2 in the direction shown by arrow E in FIG. 17 (opening direction). As shown in FIG. 20, a locking member 120b of the scanner frame 120 and a locking member 231c of the middle frame 231 engage with each other, thereby limiting the maximum angle of the scanner unit 2 to the angle shown in FIG. 17. Such a structure makes assembly easy compared to the case where the link members 222 have a lock mechanism for limiting the motion of the scanner unit 2 in the direction shown by arrow E, because the link members 222 need not be hooked on holding parts in advance.

Next, the recording unit 3 will be described. In FIG. 2, recording sheets are conveyed leftward in the recording unit 3. Recording sheets stacked on an intermediate plate 36 are pressed against a feeding roller 34 by a cam (not shown). The feeding roller 34 feeds the recording sheets one at a time into the recording unit 3 in cooperation with a separating roller 35. Of the rollers 34 and 35, the feeding roller 34 is driven. The separating roller 35 does not rotate unless a torque in the rotating direction over a certain magnitude is exerted on it. If a plurality of recording sheets are inserted between the rollers, the force rotating the separating roller 35 is larger than the force separating the recording sheets, and therefore the recording sheets can be conveyed one at a time. The recording sheet separated by the rollers 34 and 35 is sent to a conveying roller 37a. The conveying roller 37a and a pinch roller 37b convey the recording sheet at a constant speed through a place where a recording head forms an image.

Figure 29:
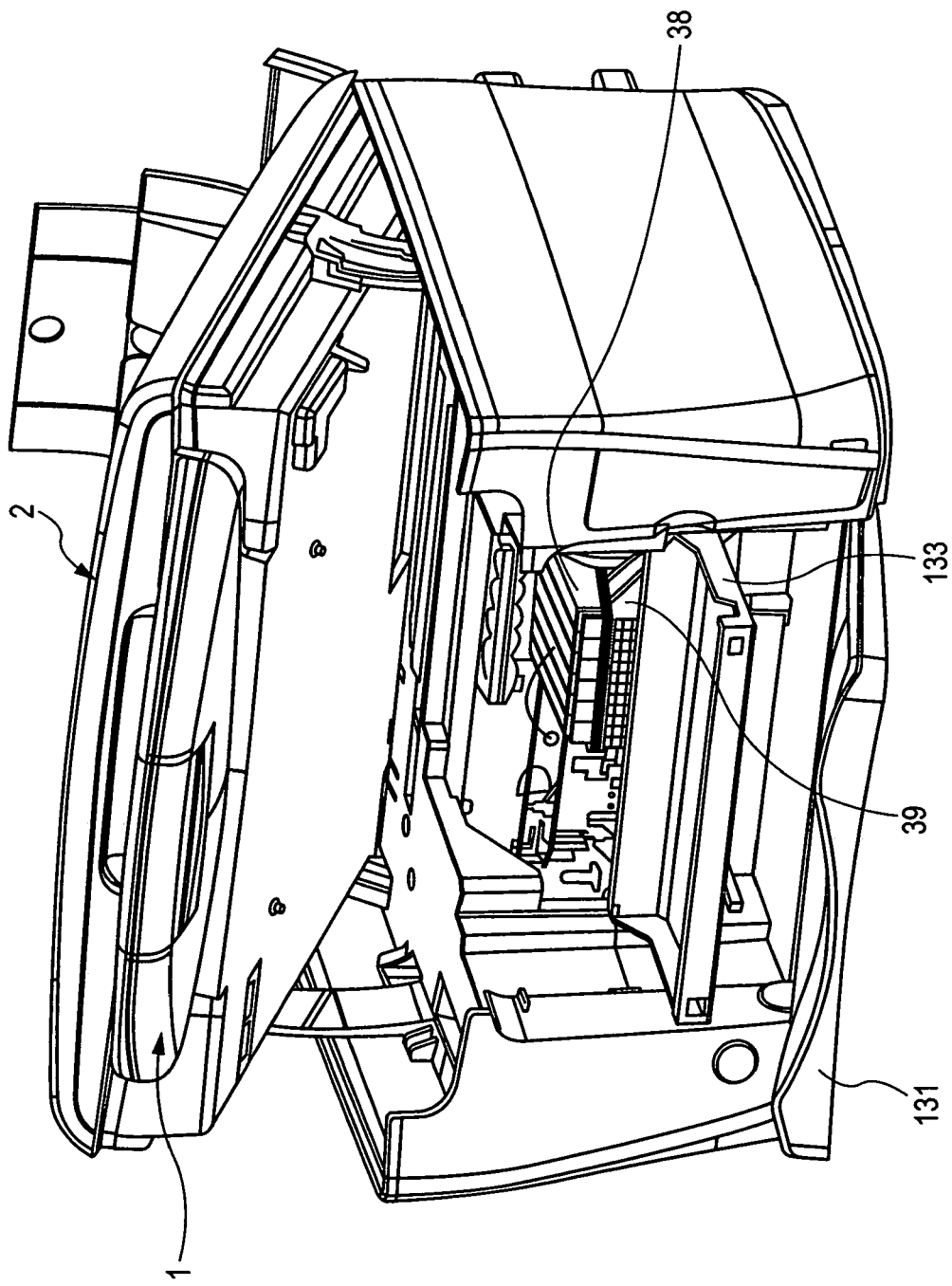
FIG. 29 is a schematic perspective view showing the image reading and recording apparatus with the scanner unit and a cartridge door open.
Figure 31:
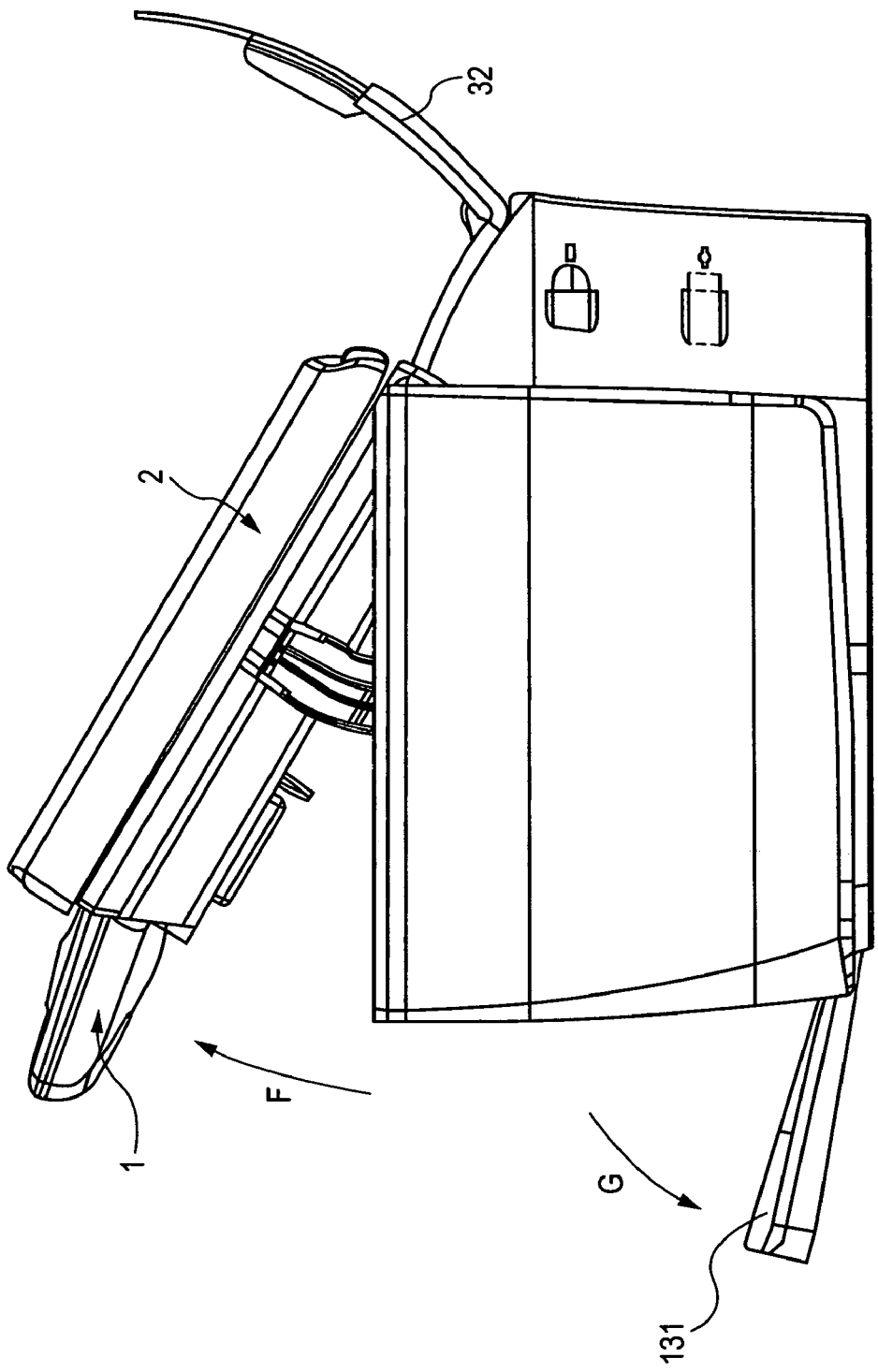
FIG. 31 is a schematic side view of the image reading and recording apparatus of FIG. 29.

FIG. 29 is a schematic perspective view showing the image reading and recording apparatus with the scanner unit 2 and a cartridge door 133 open. FIG. 31 is a schematic side view of the image reading and recording apparatus of FIG. 29. As shown in FIG. 29, the recording unit 3 includes a head cartridge 39 and color ink tanks 38. The head cartridge 39 includes integrated color recording heads (print heads, for example, ink jet recording heads). The head cartridge 39 is mounted on a carriage moving along a guide shaft 134 (see FIG. 2) in a direction perpendicular to the direction in which a recording sheets is conveyed. The head cartridge 39 moves together with the carriage in the main scanning direction and forms (records) an image on the recording sheet.

The recorded sheet is discharged onto a discharged-sheet tray 131 by a discharging roller pair 130 (see FIG. 2). At the start of recording operation, the discharged-sheet tray 131 automatically opens in the direction shown by arrow G in FIG. 31. Therefore, if the user forgets to open the discharged-sheet tray 131, sheet jams can be prevented. The discharged-sheet tray 131 automatically opens also when the scanner unit 2 is raised (opened) in the direction shown by arrow F in FIG. 31. In this case, the discharged-sheet tray 131 automatically opens on the principle described below.

Figure 21:
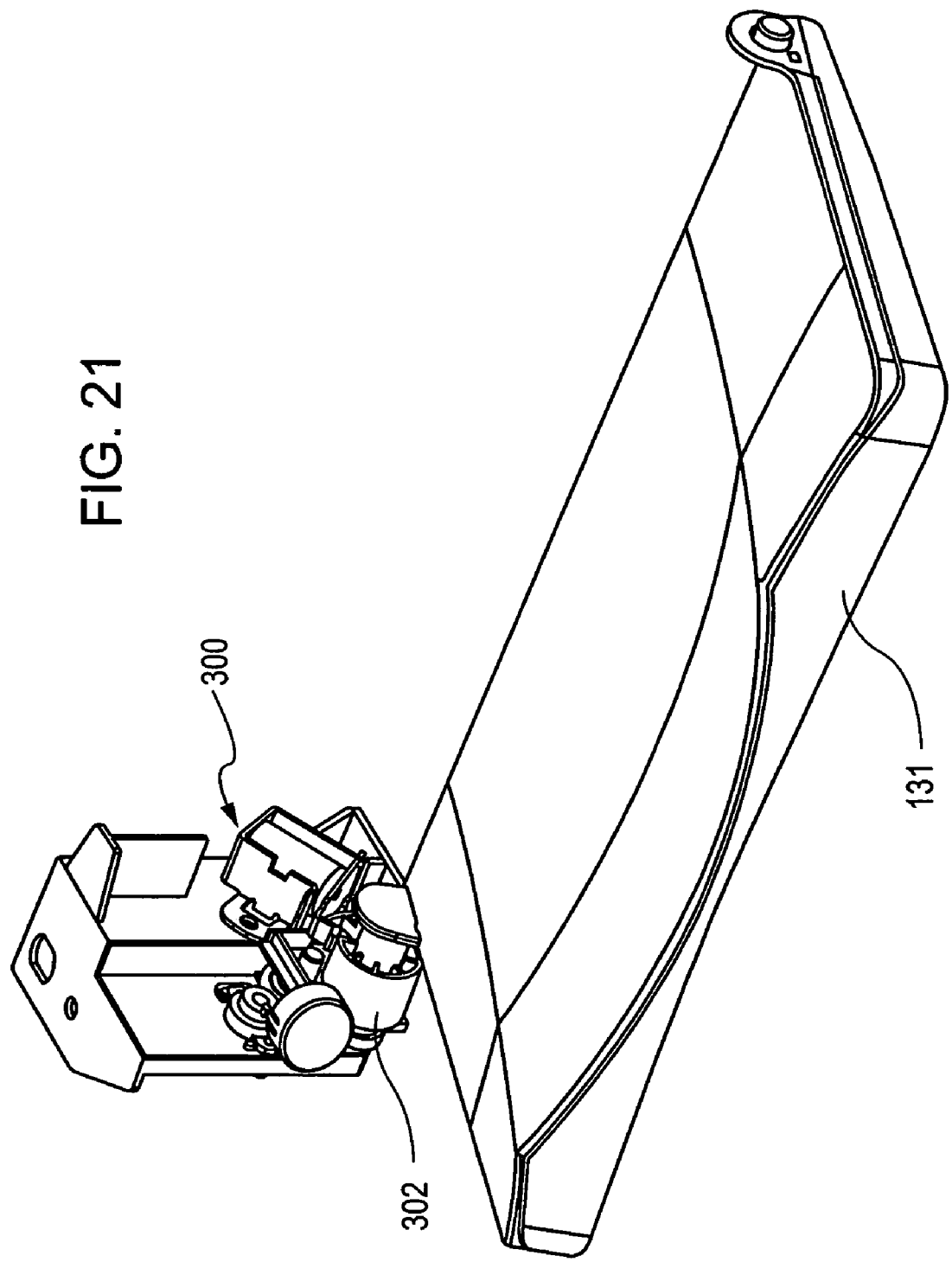
FIG. 21 is a schematic perspective view of an opening and closing mechanism for a discharged-sheet tray of the image reading and recording apparatus.
Figure 22:
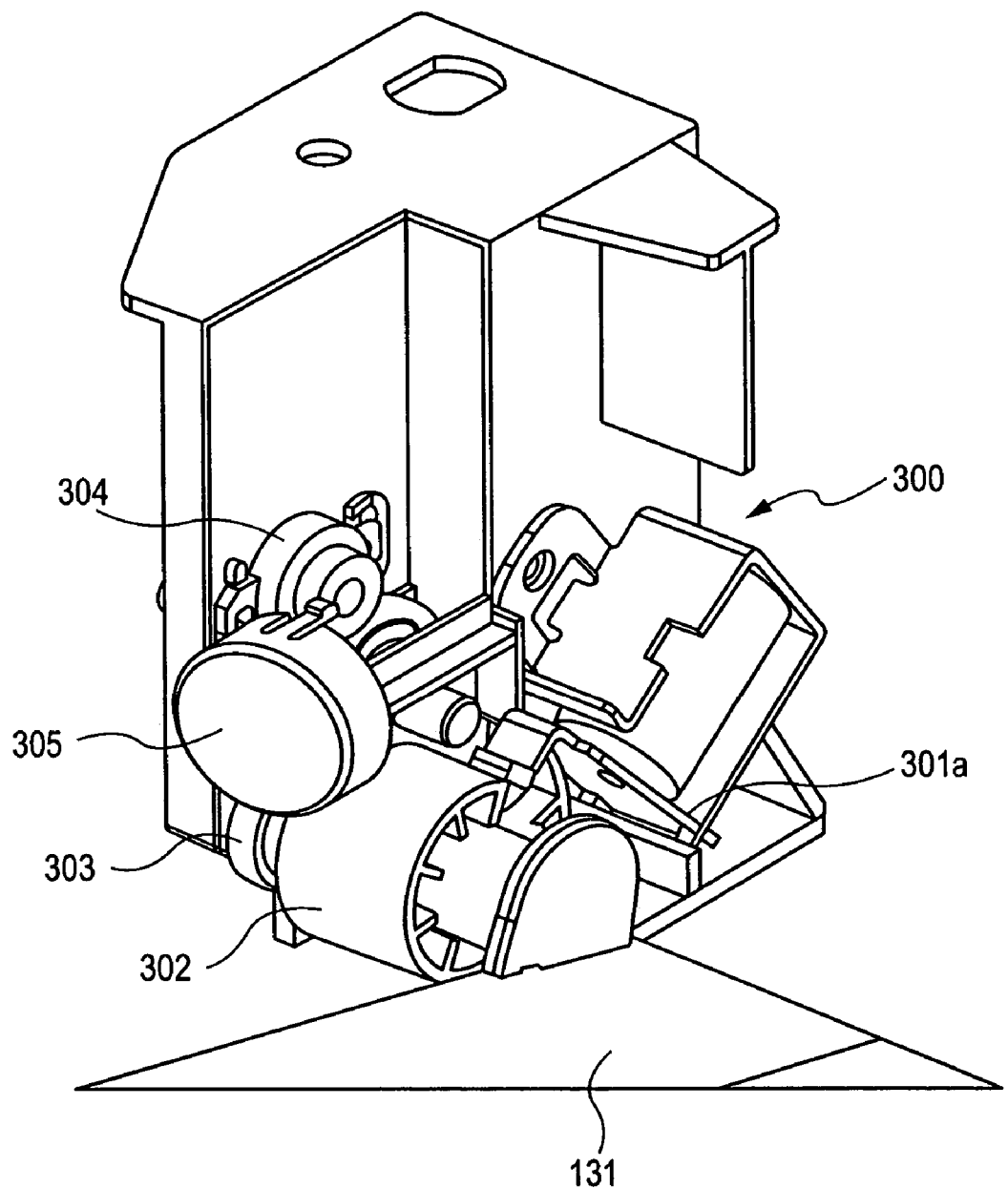
FIG. 22 is an enlarged schematic perspective view of the opening and closing mechanism.
Figure 23:
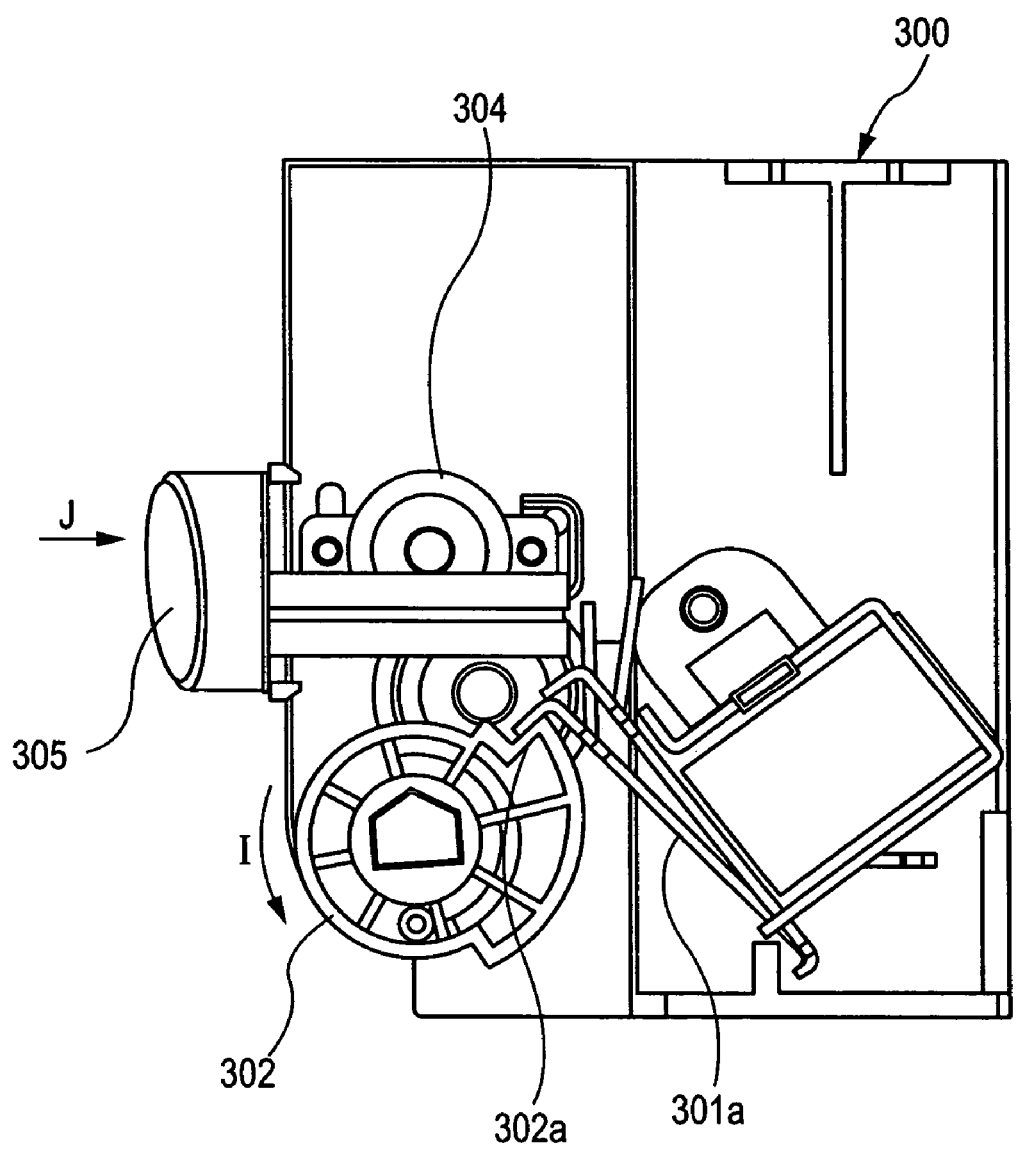
FIG. 23 is a schematic vertical sectional view of the opening and closing mechanism.
Figure 24:
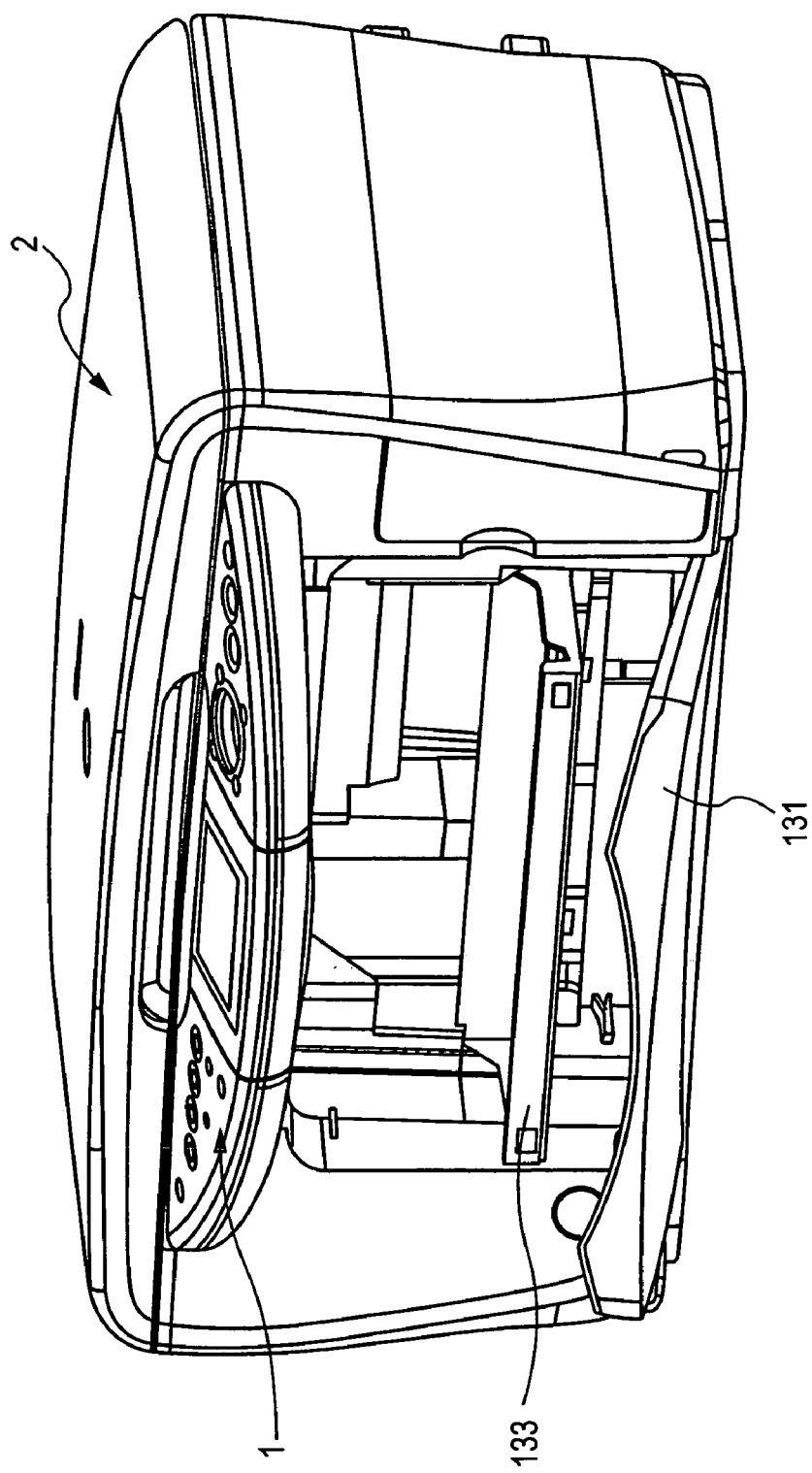
FIG. 24 is a schematic perspective view showing the image reading and recording apparatus with the discharged-sheet tray and a cartridge door open.

Next, the mechanism for automatically opening the discharged-sheet tray 131 will be described. FIG. 21 is a schematic perspective view of an opening and closing mechanism 300 for the discharged-sheet tray 131. FIG. 22 is an enlarged schematic perspective view of the opening and closing mechanism 300. FIG. 23 is a schematic vertical sectional view of the opening and closing mechanism 300. FIG. 24 is a schematic perspective view showing the image reading apparatus with the discharged-sheet tray 131 and the cartridge door 133 open. As shown in FIG. 21, one of pivot ears of the discharged-sheet tray 131 is joined to the opening and closing mechanism 300. As shown in FIGS. 21 and 22, a cam gear 302 is joined to the discharged-sheet tray 131. The rotation angle of the cam gear 302 and the rotation angle of the discharged-sheet tray 131 are in a certain ratio.

When the discharged-sheet tray 131 is closed, the discharged-sheet tray 131 is urged in the opening direction by a torsion coil spring 303. Since a movable plate 301a of a solenoid 301 is hooked with a step 302a of the cam gear 302, the discharged-sheet tray 131 is held closed. An electrical signal activates the solenoid 301, and the movable plate 301a moves so as to be unhooked from the cam gear 302. Since the cam gear 302 is urged, the cam gear 302 rotates in the direction shown by arrow I in FIG. 23. In the first stage of the opening operation of the discharged-sheet tray 131, the cam gear 302 is urged by the torsion coil spring 303, but in the middle stage, the urging force runs out so that the discharged-sheet tray 131 can open (fall) by its own weight.

In the middle stage of the opening operation, the cam gear 302 engages with an oil damper 304 through an idler gear (not shown). This reduces the speed at which the discharged-sheet tray 131 opens, so as to reduce impact noise when the discharged-sheet tray 131 falls onto something. The movable plate 301a of the solenoid 301 can be manually (not electrically) operated by pressing a discharged-sheet tray key 305 in the direction shown by arrow J in FIG. 23. Such manual operation of the discharged-sheet tray key 305 releases the cam gear 302 to open the discharged-sheet tray 131.

When the ink tanks 38 (see FIG. 29) are replaced, first, the scanner unit 2 is raised in the direction shown by arrow F (see FIG. 31). The above-described automatic opening and closing mechanism opens the discharged-sheet tray 131. Next, the cartridge door 133 is opened as shown in FIG. 24. The ink tanks 38 moves to a position such that the user can replace them.

Incidentally, the present embodiment uses an ink-jet recording head as a recording device in the recording unit 3. The ink-jet recording head discharges ink from nozzles onto a recording medium (recording sheet). Thermal energy can be used to discharge ink. The ink-jet recording head can include a thermal energy generator (e.g., an electro-thermal transducer or a laser) for changing the state of ink. Such an ink-jet recording head can achieve high-density and high-resolution recording. The representative structure and principal of such an ink-jet recording head are discussed in U.S. Pat. Nos. 4,723,129 and 4,740,796.

The method discussed in these documents can be applied to both an on-demand type and a continuous type. Especially in the case of an on-demand type, an electro-thermal transducer is disposed next to a liquid path holding liquid (ink). At least one drive signal corresponding to recorded information is applied to the electro-thermal transducer. According to the drive signal, the electro-thermal transducer generates thermal energy and rapidly heats ink. The thermal energy causes film boiling to ink to create bubbles one-to-one corresponding to the drive signals.

As the bubble expands, some of the ink is pushed out of a nozzle. At least one ink drop is discharged. A pulse drive signal can immediately and appropriately make bubbles expand and collapse and therefore can achieve highly responsive ink discharge. The pulse drive signal is discussed in U.S. Pat. Nos. 4,463,359 and 4,345,262. In addition, when the rate of rise in temperature satisfies the conditions discussed in U.S. Pat. No. 4,313,124, excellent recording can be achieved.

In the recording head, nozzles, liquid paths, and electro-thermal transducers can be configured as discussed in the above documents (a straight liquid path or a right angle liquid path). In addition, a heating surface may be disposed in a bent part as discussed in U.S. Pat. Nos. 4,558,333 and 4,459,600. Moreover, the recording head may have a structure in which a slot common to a plurality of electro-thermal transducers is a discharging part of the electro-thermal transducers as discussed in Japanese Patent Laid-Open No. 59-138461. Furthermore, a full-line-type recording head may be used. The full-line-type recording head has a length covering the width of the largest recording medium the recording apparatus can use. The full-line-type recording head may be composed of a plurality of short recording heads. Alternatively, the full-line-type recording head may be composed of a single long recording head.

A replaceable chip-type recording head may be used. When the chip-type recording head is attached to the apparatus body, it is electrically connected with the apparatus body, and it is supplied with ink from the apparatus body. Alternatively, a cartridge-type recording head may be used. The cartridge-type recording head is a recording head with integral ink tank. In order to maintain ink-discharging performance and to ensure stable image-recording, the recording apparatus can include various devices for recovering the recording head and a preliminary auxiliary device.

The above recovering devices include a device capping the recording head, a device cleaning the recording head, a device circulating ink under pressure, and a sucking device. The above preliminary auxiliary device is, for example, a preliminary heating device including an electro-thermal transducer and/or another heating element. It is also effective in stable recording to preliminarily discharging ink not for recording. The recording apparatus can have not only a monochrome recording mode but also a multicolor recording mode in which recording is performed in a plurality of colors or in full color. For the multicolor recording mode, a plurality of colors of recording head integrated into a unit may be used. Alternatively, a plurality of colors of independent recording head may be used.

Figure 25:
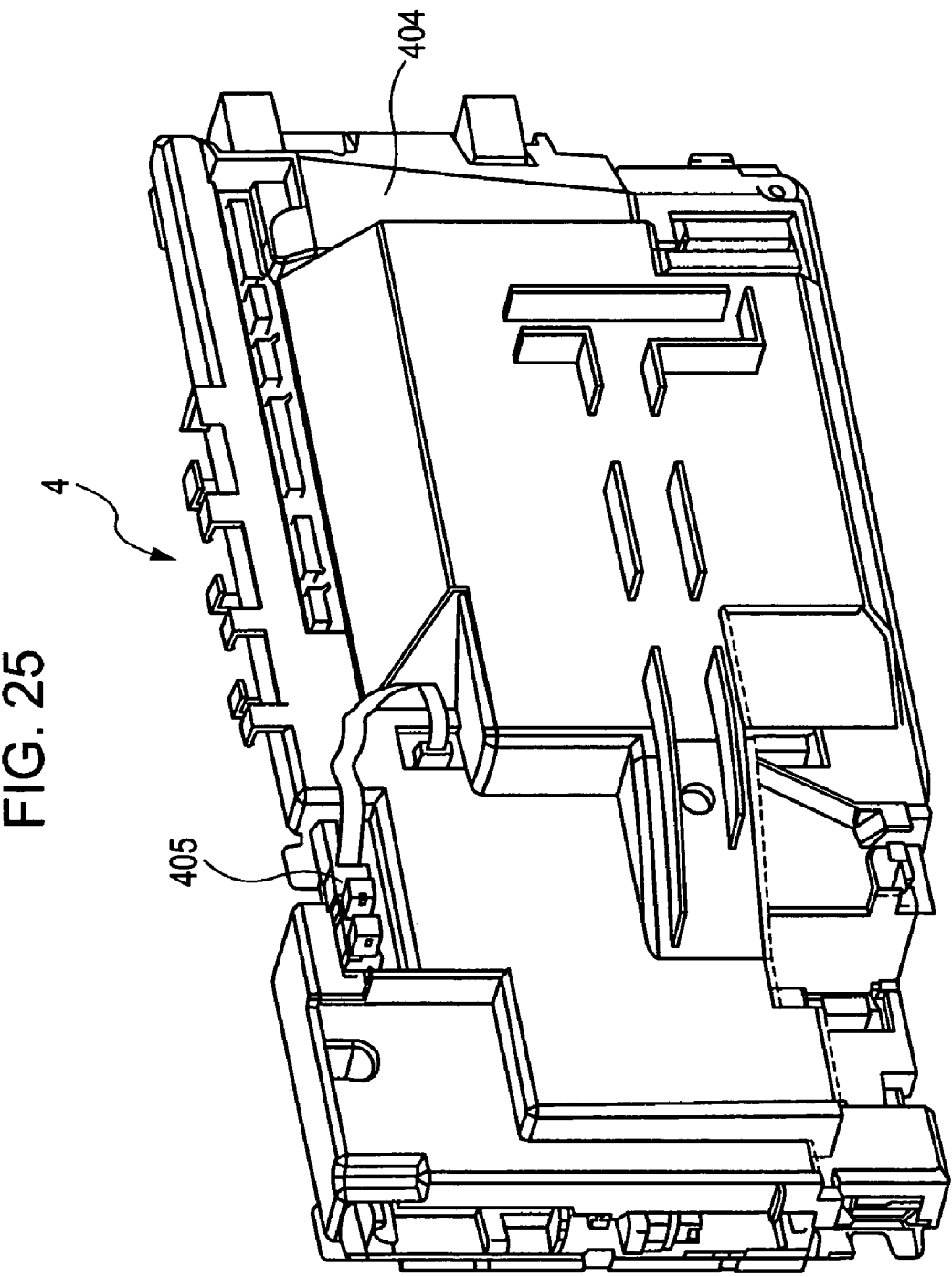
FIG. 25 is an overall schematic perspective view showing an electric board unit incorporated in the image reading and recording apparatus.
Figure 26:
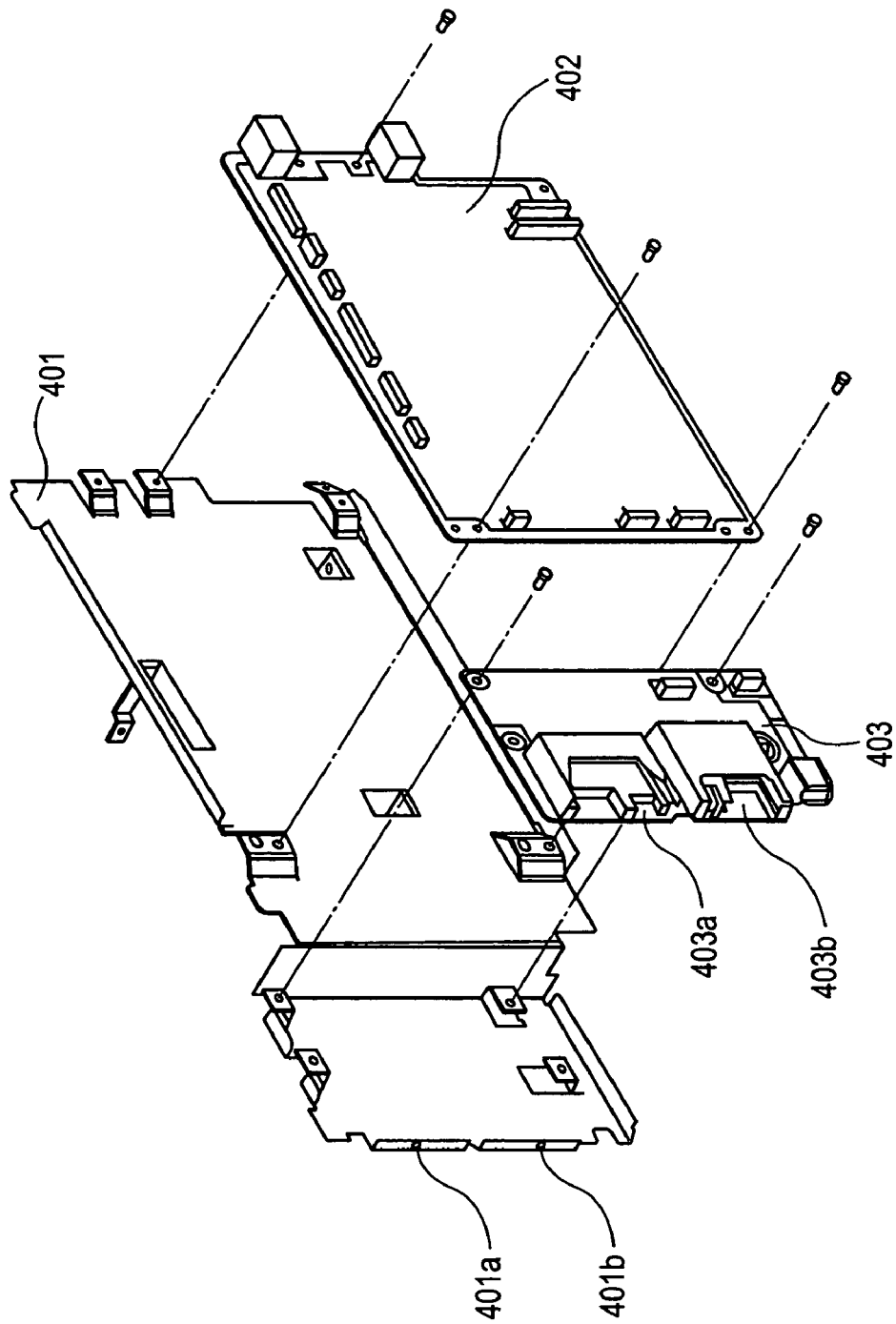
FIG. 26 is an exploded view showing how to assemble an electric board constituting the electric board unit.
Figure 27:
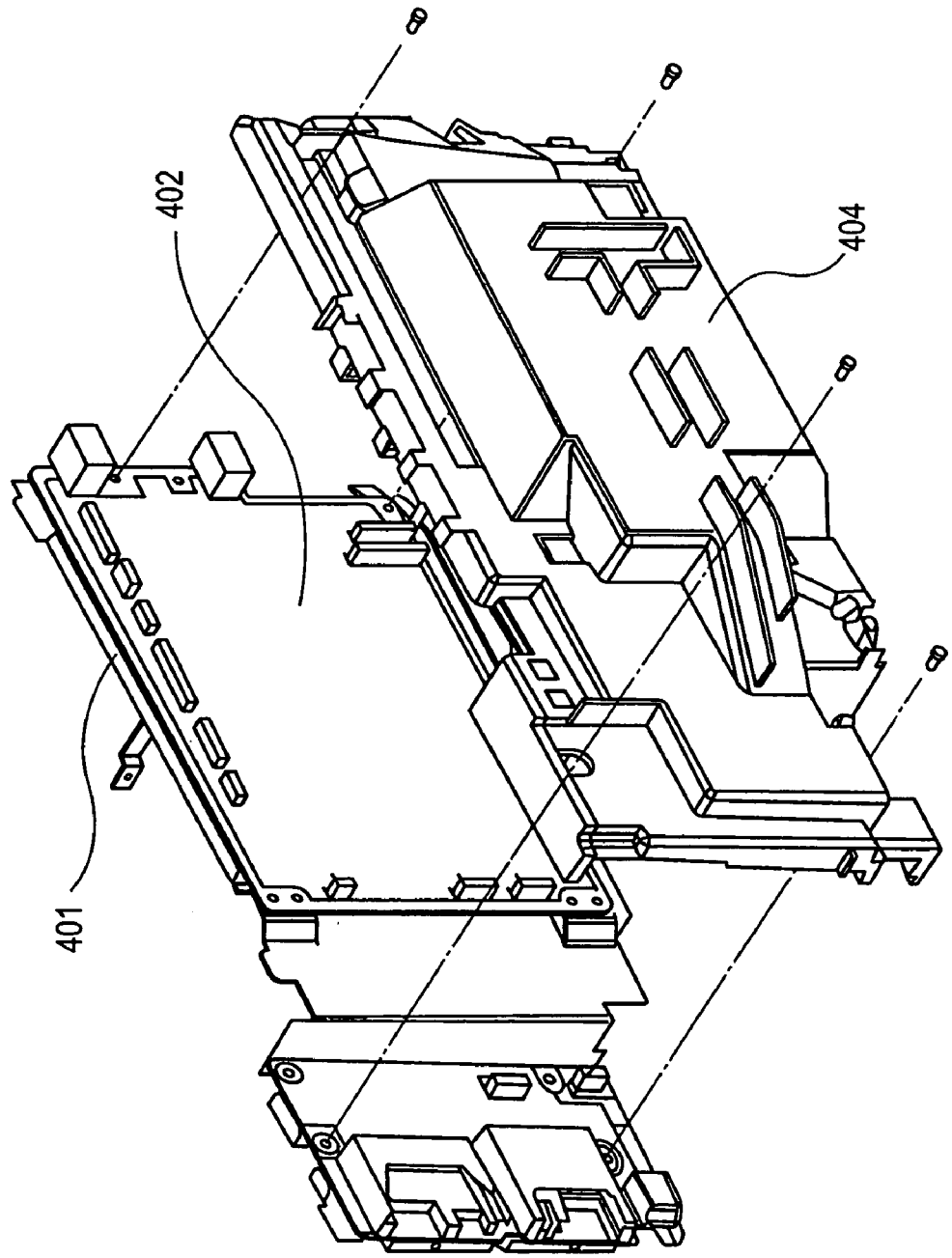
FIG. 27 is an exploded view showing how to attach a board cover to the electric board.
Figure 28:
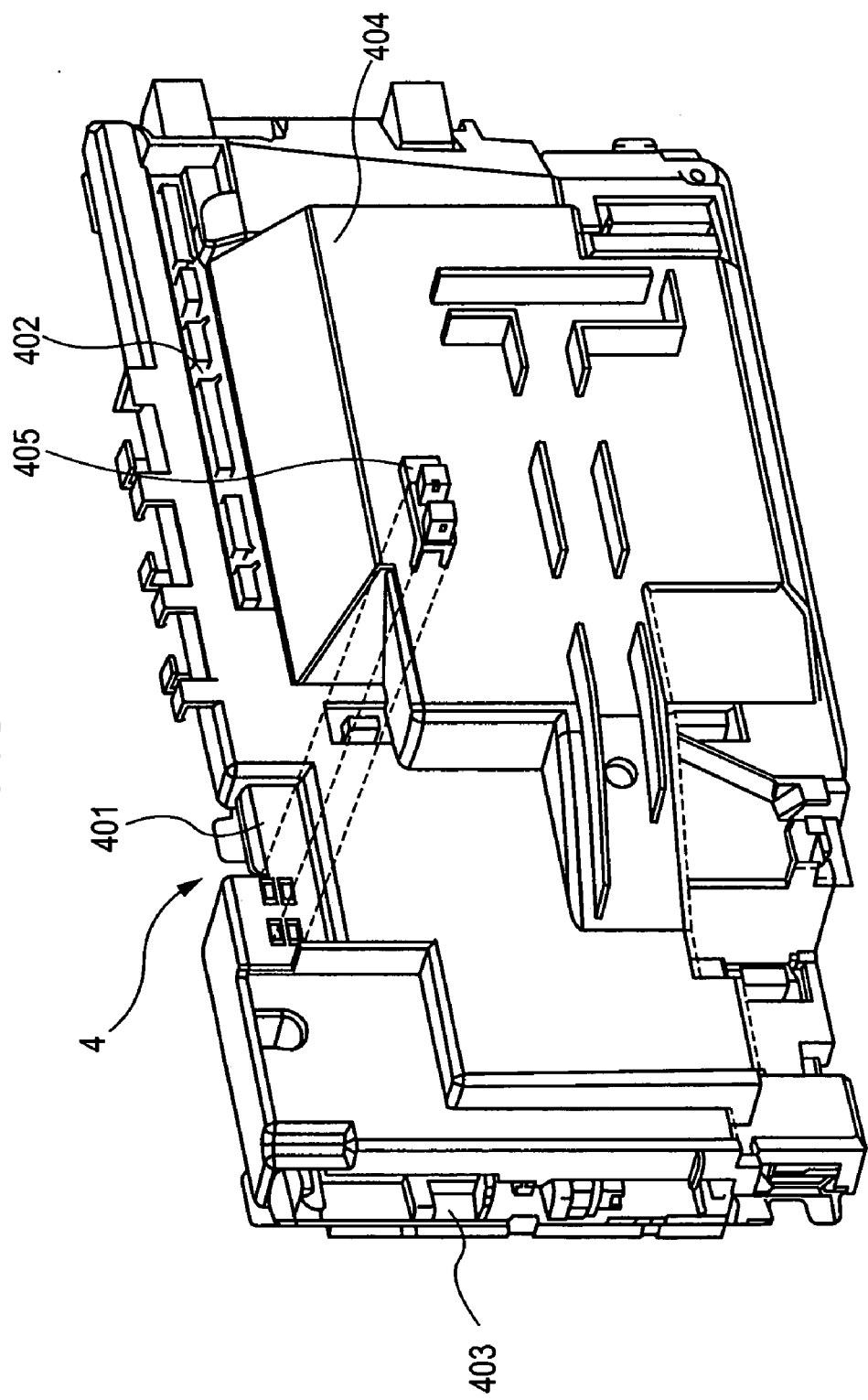
FIG. 28 is a schematic perspective view showing how to attach a photo interrupter to the assembly of FIG. 27.

Next, the electric board unit 4 constituting the memory card reader apparatus incorporated in an image forming apparatus or an image reading apparatus according to the present embodiment will be described. FIG. 25 is an overall schematic perspective view showing the electric board unit 4 incorporated in the image reading and recording apparatus of FIGS. 1 and 2. FIG. 26 is an exploded view showing how to assemble an electric board constituting the electric board unit 4. FIG. 27 is an exploded view showing how to attach a board cover to the electric board of FIG. 26. FIG. 28 is a schematic perspective view showing how to attach a photo interrupter to the assembly of FIG. 27. In the assembly of the electric board unit 4 constituting the memory card reader apparatus, as shown in FIG. 26, first, a control board 402 and a card board 403 are screwed to a board holder 401, which is formed of metal. Memory card connectors 403a and 403b are mounted on the card board 403.

Figure 30:
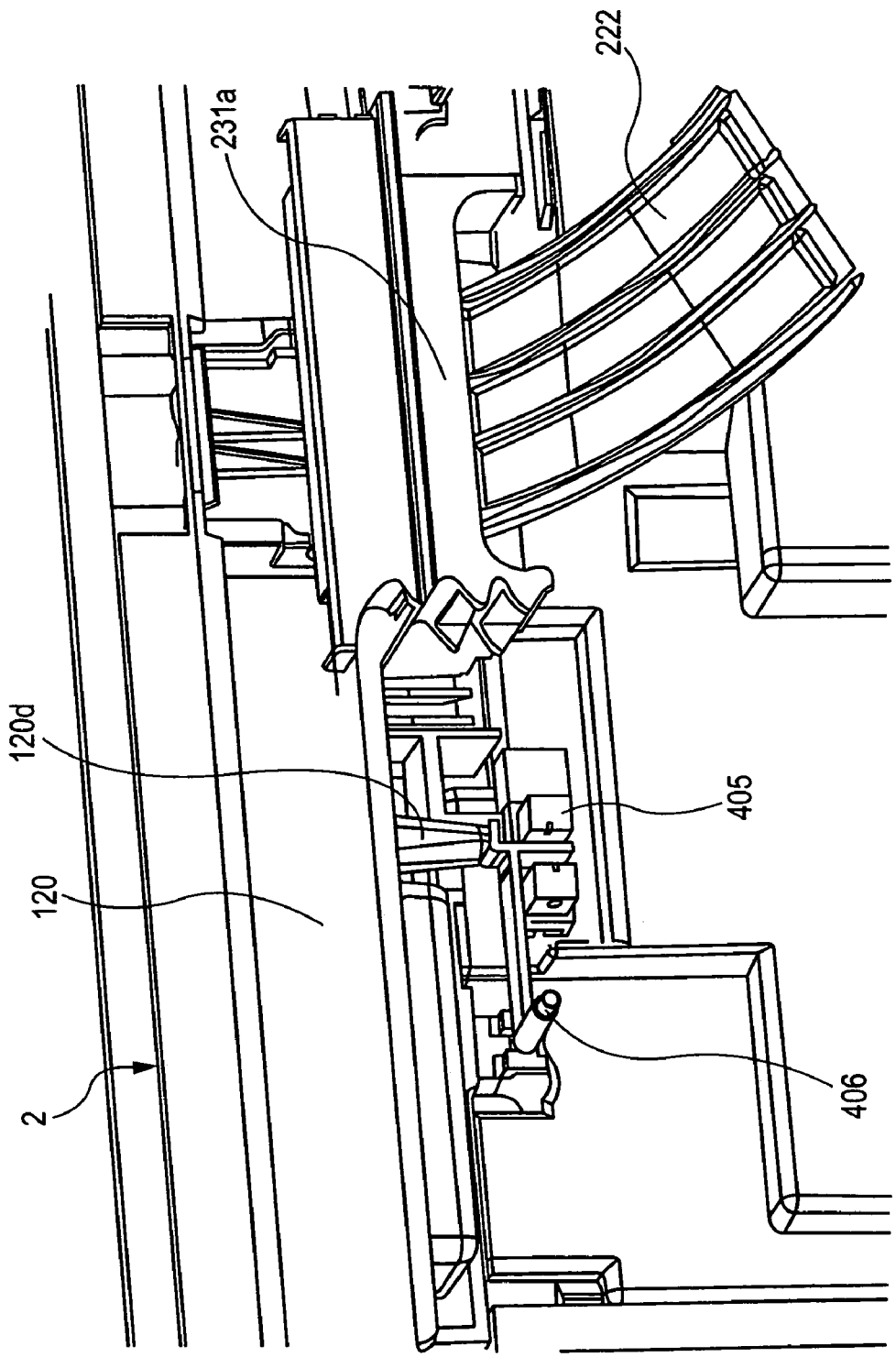
FIG. 30 is a schematic perspective view showing a device detecting whether the scanner unit is open or closed. The device includes the photo interrupter.

Next, as shown in FIG. 27, a board cover 404 is screwed to the board holder 401. The board cover 404 is formed of highly fire-resistant plastic material. The electric boards 402 and 403 are completely covered by the fire-resistant cover. As shown in FIG. 28, a photo interrupter 405 is attached to the board cover 404. The photo interrupter 405 is a sensor for detecting that the scanner unit 2 is opened as shown in FIG. 29. FIG. 30 is a schematic perspective view showing a device for detecting whether the scanner unit 2 is open or closed. The device includes the photo interrupter 405. As shown in FIG. 30, a sensor lever 406 is attached to the middle frame 231. When the scanner unit 2 is closed, the sensor lever 406 is pressed down by a projection 120d of the scanner frame 120, thereby blocking the detection beam of the photo interrupter 405. When this detecting device detects that the scanner unit 2 is open, the carriage is moved to the ink replacement position.

Figure 32:
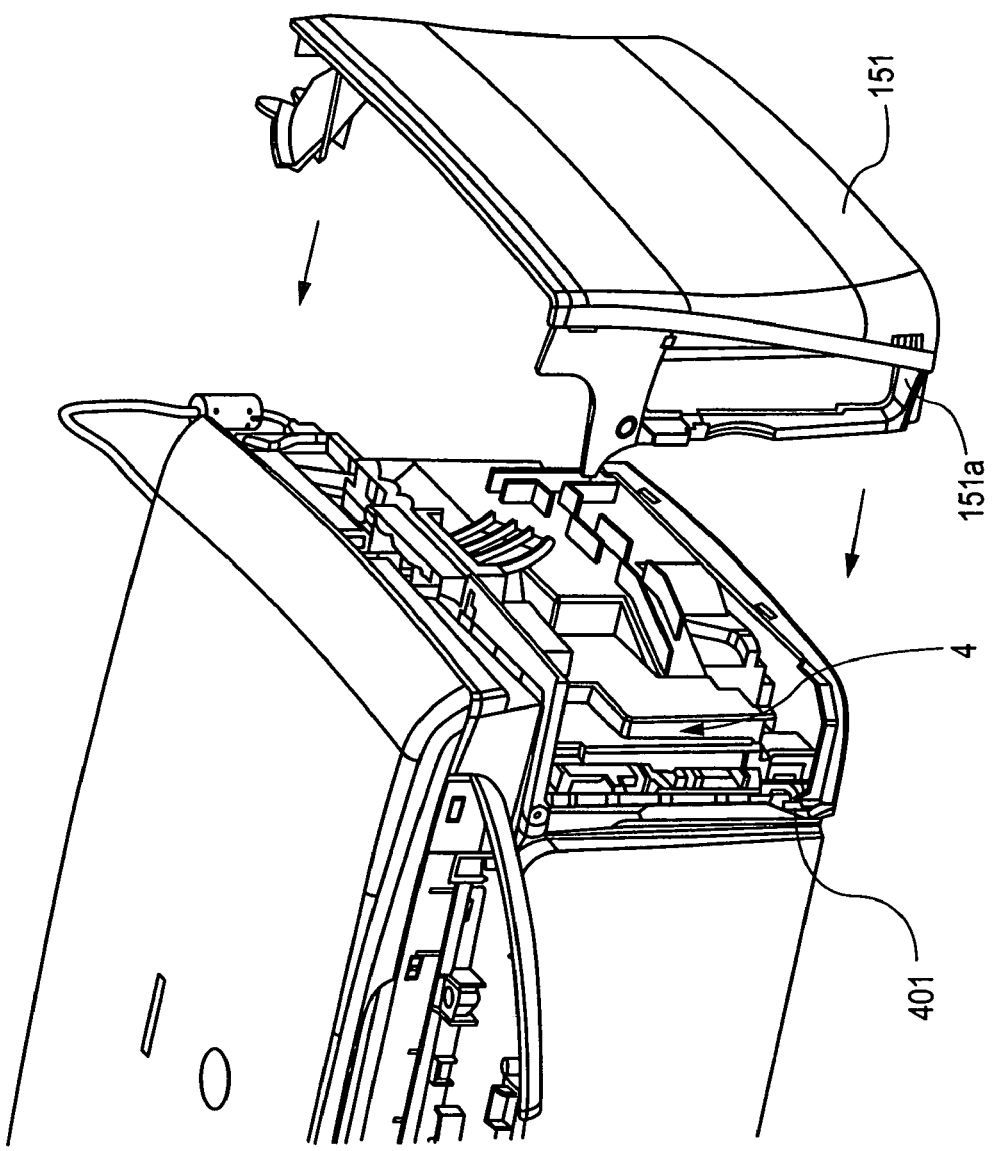
FIG. 32 is a schematic perspective view showing how to attach a side cover to the apparatus body. The side cover covers the electric board unit of FIG. 25 attached to the apparatus body. The side cover constitutes the exterior of the apparatus body.
Figure 33:
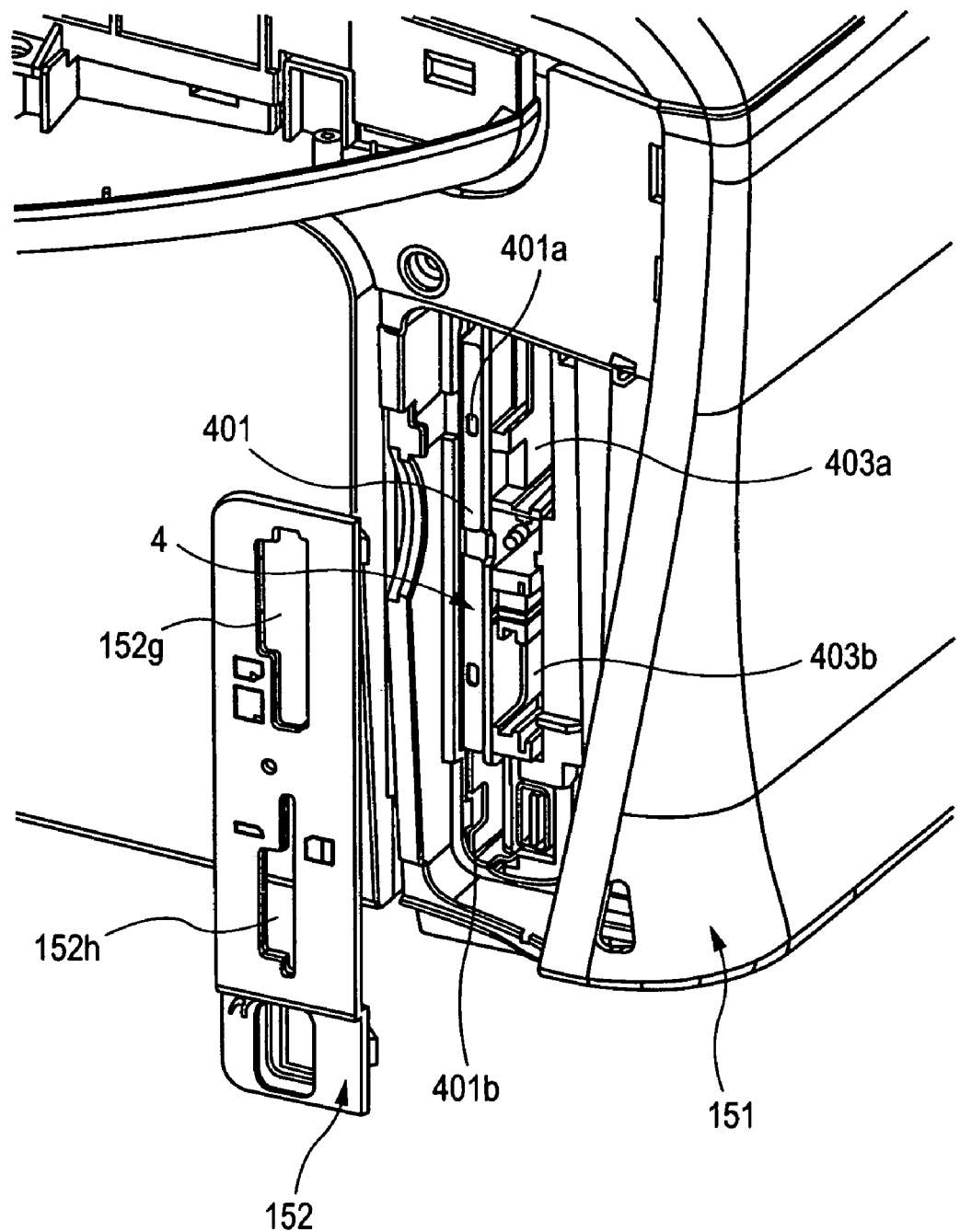
FIG. 33 is a schematic perspective view showing how to attach a card connector cover to the electric board unit attached to the apparatus body.
Figure 34:
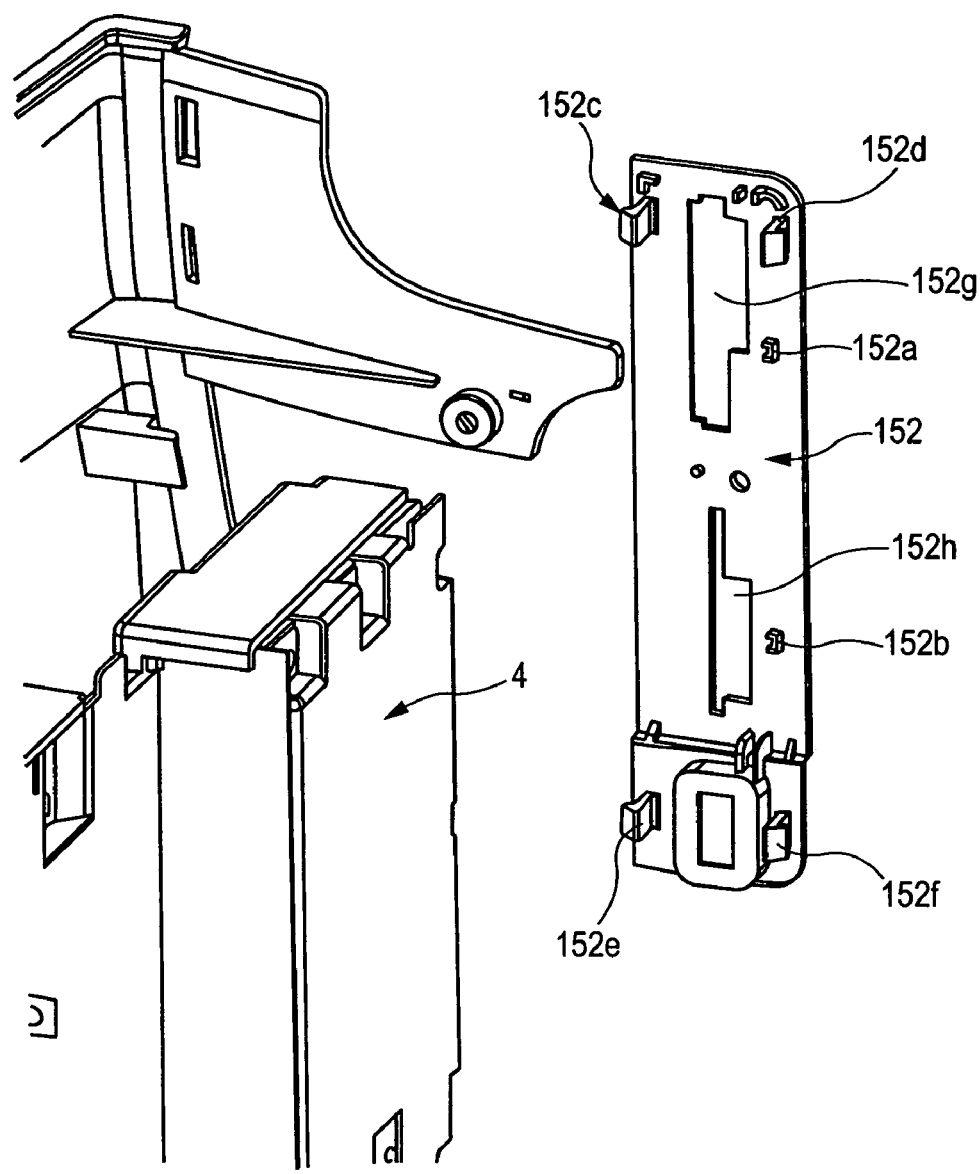
FIG. 34 is a schematic perspective view showing the back side of the card connector cover.

FIG. 32 is a schematic perspective view showing how to attach a side cover 151 to the apparatus body. The electric board unit 4 is positioned and attached to a frame of the apparatus body. The side cover 151 is also positioned and attached to the frame of the apparatus body. FIG. 33 is a schematic perspective view showing how to attach a card connector cover 152 to the electric board unit 4 attached to the apparatus body. FIG. 34 is a schematic perspective view showing the back side of the card connector cover 152. In FIGS. 32 to 34, slots of the connectors 403a and 403b, which are mounted on the board 403, are only about 1 mm in width. Therefore, if the connectors 403a and 403b are formed as a unit with the side cover (exterior cover) 151, the position of the slots of the connectors may not completely correspond with the position of the slots of the side cover.

In the present embodiment, the exterior cover (side cover) 151 has an opening 151a for exposing the connectors 403a and 403b, and the opening 151a is covered by the card connector cover 152. The board holder 401 directly holds the board (card board) 403. The board holder 401 has holes 401a and 401b (board-side engaging members). The card connector cover 152 has bosses 152a and 152b on the back (see FIG. 34). Inserting the bosses 152a and 152b into the holes 401a and 401b properly positions the card connector cover 152. The bosses 152a and 152b (cover-side engaging members) constitute a positioning device together with the board-side engaging members. This positioning device positions the card connector cover 152 relative to the board holder 401 in at least two directions perpendicular to the direction in which a memory card is inserted and pulled out. The card connector cover 152 has claws 152c, 152d, 152e, and 152f on the back. After the positioning, the claws are hooked on the edge of the opening 151a of the exterior cover 151, thereby fixing the card connector cover 152 to the electric board unit 4. In this way, accurate positioning of the card slots 152g and 152h of the card connector cover 152 relative to the connectors 403a and 403b on the board 403 in the electric board unit 4 can be easily performed.

Figure 35A:
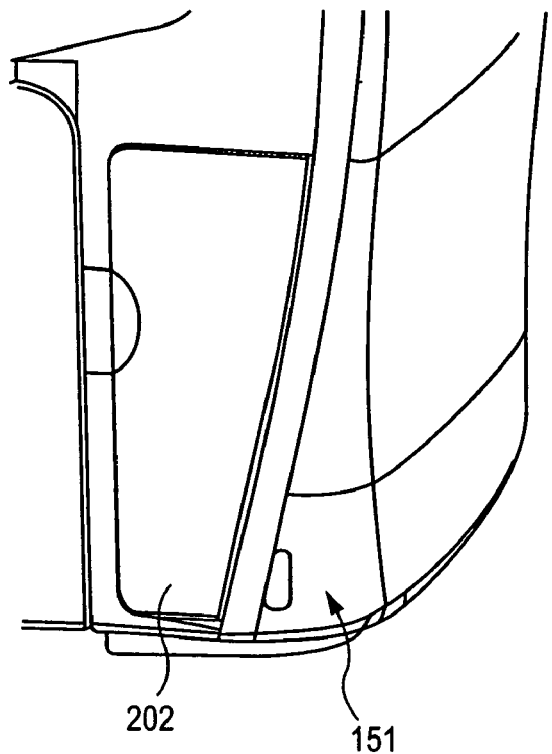
FIGS. 35A and 35B are schematic perspective views showing a memory card lid provided in the exterior cover of the image reading and recording apparatus.
Figure 35B:
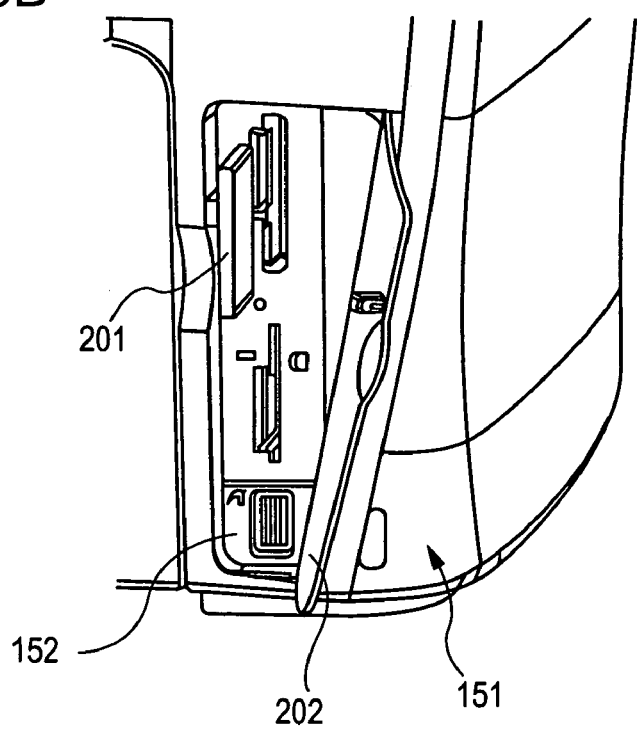

Next, an example of operation of the memory card reader apparatus will be described. When not used, as shown in FIG. 35A, card slots are covered by a lid 202, which makes the front face flat and keeps the card slots free from dust. When used, as shown in FIG. 35B, the lid 202 is opened to expose the card slots, and then a memory card 201 is inserted into one of the card slots. Next, the photo mode is selected with the mode key 13e. Images are displayed on the LCD. An image to be printed is selected, and the print operation is started. The lid 202 can be closed also when one of the memory card slots is in use, and therefore the other slot not in use can be kept free from dust.

Next, an example of operation of the image reading and recording apparatus according to the present embodiment will be described. The image reading and recording apparatus is operated by selectively operating the various keys 13 of the panel unit 1 shown in FIG. 3. The operation for photocopying will be taken as an example. First, the power key 13f is pressed, and a copy key 13e-1 is selected from the mode keys 13e. Next, the image quality and the recording media are selected with the base 13d-2 of the arrow key 13d, and the number of copies is set with the top 13d-1 of the arrow key 13d. Next, the pressing plate 21 (see FIG. 2) is opened, and a document to be copied is set on the glass plate 23. In addition, recording sheets are set on the auxiliary tray 32 (see FIG. 2). Finally, in the case of color copy, the color start key 13a is pressed, and in the case of monochrome copy, the monochrome start key 13b is pressed.

The keys 13 of the panel unit 1 are arranged in the order of operating from the left to the right so that all operations can be naturally performed without omission. The above describes the operation for photocopying as an example. When a scanning mode is selected with the mode keys 13e, scanning operation can be performed from a PC connected via the USB interface. In the case of recording images stored in a memory card, the memory card is inserted into one of the card connecters 403a and 403b of the board (card board) 403 through one of the card slots 152g and 152h in the card connector cover 152. Next, a photograph mode is selected, and the recording unit 3 can record the images stored in the memory card.

The above-described memory card reader apparatus includes an electric board 403 and a board holder 401 holding the electric board 403. The electric board 403 includes connectors 403a and 403b into which memory cards are inserted. In addition, the memory card reader apparatus includes a card connector cover 152 and an exterior cover different from the card connector cover 152. The card connector cover 152 has card slots 152g and 152h. The board holder 401 is positioned relative to the exterior cover either directly or indirectly. The board holder 401 and the card connector cover 152 are positioned in at least two directions perpendicular to the direction in which a memory card is inserted and pulled out. Therefore, the card slots 152g and 152h can be positioned relative to the connectors 403a and 403b respectively with a high degree of accuracy, and therefore a memory card can be inserted smoothly and set firmly.

The image reading apparatus according to the present invention can be widely applied to various recording apparatuses regardless of how the recording head scans, and achieves the same advantages. The recording apparatuses include a serial-type recording apparatus, in which a recording head scans in the main scanning direction, and a line-type recording apparatus, in which a recording head has a length covering the full width or part of the recording sheet and scans only in the sub-scanning direction. The present invention is particularly helpful for an ink-jet recording apparatus, which places drops of ink onto paper to perform recording. However, the present invention can be applied to recording apparatuses of other recording methods, for example, a thermal transfer recording apparatus, a laser beam irradiation recording apparatus, and a wire dot recording apparatus, and achieves the same advantages.

The present invention can be applied to ink-jet recording apparatuses including a recording apparatus using a single recording head, a color recording apparatus using a plurality of recording heads recording with different color inks, a tone recording apparatus using a plurality of recording heads recording in the same color and different densities, and a recording apparatus combining these, and achieves the same advantages. In addition, the present invention can be applied to any ink-jet recording apparatus regardless of arrangement of a recording head and an ink tank, and achieves the same advantages. For example, the present invention can be applied to an ink-jet recording apparatus using a replaceable ink cartridge that combines a recording head and an ink tank, and an ink-jet recording apparatus using a recording head and an ink tank that is separate from the recording head and connected to the recording head with an ink supply tube.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-262476 filed Sep. 9, 2004, which is hereby incorporated by reference herein in its entirety.

What is claimed is:
1. A memory card reader apparatus comprising:
an electric board including a connector into which a memory card is inserted;

a board holder holding the electric board, wherein the electric board is fixed to the board holder, and the board holder is positioned and attached to a frame of the memory card reader apparatus body;

a board cover fixed to the board holder so as to cover the electric board;

a card connector cover having a card slot, wherein the card connector cover has claws;

an exterior cover different from the card connector cover and configured to cover the board holder and the board cover, wherein the exterior cover has an opening for exposing the connector, and the exterior cover is positioned and attached to the frame of the memory card reader apparatus body;

a lid that covers the card slot, the lid making the surface of the exterior cover flat; and a positioning device positioning the card connector cover relative to the board holder so that the card slot is positioned relative to the connector while the claws are hooked on the edge of the opening of the exterior cover, thereby fixing the card connector cover to the exterior cover.

2. The memory card reader apparatus according to claim 1, wherein the exterior cover covers a body of an image forming apparatus.

3. The memory card reader apparatus according to claim 2, wherein the exterior cover covers a body of an image reading apparatus.

4. The memory card reader apparatus according to claim 3, wherein the memory card reader apparatus is incorporated in an image reading apparatus that reads a document.

5. The memory card reader apparatus according to claim 2, wherein the memory card reader apparatus is incorporated in an image forming apparatus that forms an image in accordance with recorded information.

6. The memory card reader apparatus according to claim 1, wherein the exterior cover covers a body of an image reading apparatus.

7. The memory card reader apparatus according to claim 6, wherein the memory card reader apparatus is incorporated in an image reading apparatus that reads a document.

8. The memory card reader apparatus according to claim 1, wherein the memory card reader apparatus is incorporated in an image forming apparatus that forms an image in accordance with recorded information.

9. The memory card reader apparatus according to claim 1, wherein the memory card reader apparatus is incorporated in an image reading apparatus that reads a document.

10. A memory card reader apparatus comprising:

an electric board including a connector into which a memory card is inserted;

a board holder holding the electric board, wherein the electric board is fixed to the board holder, and the board holder is fixed to a frame of the memory card reader apparatus;

a board cover fixed to the board holder so as to cover the electric board;

an exterior cover that covers the electric board and the board holder and has an opening for exposing the connector, wherein the exterior cover is fixed to the frame;

a card connector cover that covers the opening and has a card slot for inserting the memory card into the connector, wherein the card connector cover has claws;

a lid that covers the card slot, the lid making the surface of the exterior cover flat; and a positioning device for positioning the card connector cover relative to the board holder so that the card slot is positioned relative to the connector while the claws are hooked on the edge of the opening of the exterior cover, thereby fixing the card connector cover to the exterior cover.

* * * * *